United States Patent
Khoshnevisan et al.

(10) Patent No.: US 12,413,359 B2
(45) Date of Patent: Sep. 9, 2025

(54) UNEQUAL PRECODING RESOURCE BLOCK GROUP SIZES FOR MULTIPLE-CODEWORD DOWNLINK DATA TRANSMISSIONS

(71) Applicant: QUALCOMM Incorporated, San Diego, CA (US)

(72) Inventors: Mostafa Khoshnevisan, San Diego, CA (US); Ahmed Abdelaziz Ibrahim Abdelaziz Zewail, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 637 days.

(21) Appl. No.: 17/828,352

(22) Filed: May 31, 2022

(65) Prior Publication Data
US 2024/0022368 A1 Jan. 18, 2024

(51) Int. Cl.
*H04L 5/00* (2006.01)
*H04W 72/0453* (2023.01)
*H04W 72/23* (2023.01)

(52) U.S. Cl.
CPC .......... *H04L 5/0048* (2013.01); *H04L 5/0035* (2013.01); *H04W 72/0453* (2013.01); *H04W 72/23* (2023.01)

(58) Field of Classification Search
CPC .......... H04W 72/0453; H04W 72/23; H04L 5/0048; H04L 5/0035; H04L 5/0044
See application file for complete search history.

(56) References Cited

U.S. PATENT DOCUMENTS

| | | | | |
|---|---|---|---|---|
| 2014/0341050 A1* | 11/2014 | Luo | ...... | H04L 5/0053 370/252 |
| 2019/0261331 A1* | 8/2019 | Guthmann | ............ | H04L 5/0007 |
| 2019/0313386 A1* | 10/2019 | Hwang | ................ | H04L 5/0094 |
| 2020/0112419 A1* | 4/2020 | Bagheri | ................ | H04L 5/0057 |
| 2020/0136690 A1* | 4/2020 | Noh | ........ | H04L 5/001 |
| 2022/0116967 A1* | 4/2022 | Yeo | ................ | H04W 72/1268 |
| 2022/0408470 A1* | 12/2022 | Jung | ................ | H04W 72/23 |
| 2023/0120684 A1* | 4/2023 | Gha | ........ | H04L 1/1822 370/329 |
| 2023/0337233 A1* | 10/2023 | Zhou | ................ | H04L 5/0055 |
| 2024/0340112 A1* | 10/2024 | Ying | ................ | H04W 72/232 |

* cited by examiner

*Primary Examiner* — Andrew Lee
(74) *Attorney, Agent, or Firm* — Kevin M. Donnelly; Holland & Hart LLP

(57) ABSTRACT

Methods, systems, and devices for wireless communications are described. A receiving device may receive (e.g., from a transmitting device) one or more control messages indicating a first physical resource block (PRB) bundling size for a first set of two or more layers of a downlink shared channel and a second PRB bundling size for a second set of two or more layers of the downlink shared channel. The receiving device may receive a downlink transmission (e.g., a downlink shared channel transmission) that includes multiple codewords, such as a first codeword corresponding to the first set of two or more layers and a second codeword corresponding to the second set of two or more layers. The receiving device may receive the downlink transmission and may decode each codeword based on one or more channel estimates using the first PRB bundling size and the second PRB bundling size.

29 Claims, 16 Drawing Sheets

UNEQUAL PRECODING RESOURCE BLOCK GROUP SIZES FOR MULTIPLE-CODEWORD DOWNLINK DATA TRANSMISSIONS

FIELD OF TECHNOLOGY

The following relates to wireless communications, including unequal precoding resource block group (PRG) sizes for multiple-codeword downlink data transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support unequal precoding resource block group (PRG) sizes for multiple-codeword downlink data transmissions. For example, the described techniques enable a receiving device (e.g., a user equipment (UE), a network entity) to receive a downlink transmission (e.g., a downlink shared channel transmission) that includes multiple codewords, where each codeword corresponds to a set of layers of a downlink shared channel, and each set of layers may be associated with a PRG size (i.e., a physical resource block (PRB) bundling size). To this end, the receiving device may receive control signaling indicating a respective PRG size for each set of layers. The receiving device may receive the downlink transmission and may decode each codeword based on the PRG sizes. For example, the receiving device may decode each codeword based on performing one or more channel estimations using the PRG sizes.

In some examples, each set of layers may be dynamically or statically configured with a respective PRG size. For instance, a first set of layers may be dynamically configured with a first PRG size, while a second set of layers may be statically configured with a second PRG size. Alternatively, the first set of layers and the second set of layers may both be dynamically configured, or may both be statically configured. In a static configuration, the receiving device may receive a control message indicating the PRG size for the corresponding set of layers. In a dynamic configuration, the receiving device may receive a control message (e.g., a radio resource control (RRC) message) indicating multiple sets of PRG sizes for the set of layers, and the receiving device may receive a second control message (e.g., downlink control information (DCI) scheduling the downlink transmission) indicating one of the sets of PRG sizes from the multiple sets of PRG sizes. In such cases, the receiving device may determine a PRG size from the indicated set of PRG sizes for the set of layers.

A method for wireless communications is described. The method may include receiving one or more control messages indicating a first PRB bundling size (e.g., a first PRG size) for a first set of two or more layers of a downlink shared channel and a second PRB bundling size (e.g., a second PRG size) for a second set of two or more layers of the downlink shared channel, the first set of two or more layers being different from the second set of two or more layers, receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers, and decoding the first codeword and the second codeword based on one or more channel estimates using the first PRB bundling size and the second PRB bundling size.

An apparatus for wireless communications is described. The apparatus may include a processor, memory coupled with the processor, and instructions stored in the memory. The instructions may be executable by the processor to cause the apparatus to receive one or more control messages indicating a first PRB bundling size for a first set of two or more layers of a downlink shared channel and a second PRB bundling size for a second set of two or more layers of the downlink shared channel, the first set of two or more layers being different from the second set of two or more layers, receive, via the downlink shared channel, a downlink transmission including a set of multiple codewords, where a first codeword of the set of multiple codewords corresponds to the first set of two or more layers and a second codeword of the set of multiple codewords corresponds to the second set of two or more layers, and decode the first codeword and the second codeword based on one or more channel estimates using the first PRB bundling size and the second PRB bundling size.

Another apparatus for wireless communications is described. The apparatus may include means for receiving one or more control messages indicating a first PRB bundling size for a first set of two or more layers of a downlink shared channel and a second PRB bundling size for a second set of two or more layers of the downlink shared channel, the first set of two or more layers being different from the second set of two or more layers, means for receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers, and means for decoding the first codeword and the second codeword based on one or more channel estimates using the first PRB bundling size and the second PRB bundling size.

A non-transitory computer-readable medium storing code for wireless communications is described. The code may include instructions executable by a processor to receive one or more control messages indicating a first PRB bundling size for a first set of two or more layers of a downlink shared channel and a second PRB bundling size for a second set of two or more layers of the downlink shared channel, the first set of two or more layers being different from the second set of two or more layers, receive, via the downlink shared channel, a downlink transmission including a set of multiple codewords, where a first codeword of the set of multiple codewords corresponds to the first set of two or more layers and a second codeword of the set of multiple codewords corresponds to the second set of two or more layers, and decode the first codeword and the second codeword based on one or more channel estimates using the first PRB bundling size and the second PRB bundling size.

In some examples of the method, apparatuses, and non-transitory computer-readable medium described herein, receiving the one or more control messages may include operations, features, means, or instructions for receiving a first control message indicating the first PRB bundling size and the second PRB bundling size, where the first PRB bundling size and the second PRB bundling size may be configured as a static bundling type.

In some examples of the method, apparatuses, and non-transitory computer-readable medium described herein, the first control message includes a common indication that the first PRB bundling size and the second PRB bundling size may be both configured as the static bundling type.

In some examples of the method, apparatuses, and non-transitory computer-readable medium described herein, receiving the one or more control messages may include operations, features, means, or instructions for receiving a first control message indicating the first PRB bundling size, the first PRB bundling size being configured as a static bundling type, where the first control message indicates that the second PRB bundling size may be configured as a dynamic bundling type and further indicates a first set of PRB bundling sizes and a second set of PRB bundling sizes and receiving a second control message scheduling the downlink transmission and including an indication of one of the first set of PRB bundling sizes or the second set of PRB bundling sizes, where the second PRB bundling size may be from the first set of PRB bundling sizes or the second set of PRB bundling sizes based on the indication.

In some examples of the method, apparatuses, and non-transitory computer-readable medium described herein, the second PRB bundling size may be from the first set of PRB bundling sizes and the first set of PRB bundling sizes includes multiple PRB bundling sizes and the method, apparatuses, and non-transitory computer-readable medium may include further operations, features, means, or instructions for determining the second PRB bundling size based on a size of PRBs allocated to the second codeword, a ratio of a size of the PRBs allocated to the second codeword and size of a bandwidth part associated with the second codeword, a modulation and coding scheme (MCS) associated with the second set of two or more layers, a quantity of layers of the second set of two or more layers, or a combination thereof.

In some examples of the method, apparatuses, and non-transitory computer-readable medium described herein, the first set of two or more layers may be associated with a private data stream of the downlink transmission and the second set of two or more layers may be associated with a common data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, the first PRB bundling size may be from a set of two or more PRB bundling sizes and the method, apparatuses, and non-transitory computer-readable medium may include further operations, features, means, or instructions for determining the second PRB bundling size based on the second control message and the first set of PRB bundling sizes or the second set of PRB bundling sizes and determining that the first PRB bundling size may be the same PRB bundling size as the second PRB bundling size based on the second PRB bundling size being configured as the dynamic bundling type and the first control message indicating that the first PRB bundling size may be the same as the second PRB bundling size.

In some examples of the method, apparatuses, and non-transitory computer-readable medium described herein, the first set of two or more layers may be associated with a common data stream of the downlink transmission and the second set of two or more layers may be associated with a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, receiving the one or more control messages may include operations, features, means, or instructions for receiving a first control message indicating that the first PRB bundling size and the second PRB bundling size may be configured as a dynamic bundling type, where the first control message indicates a first set of PRB bundling sizes and a second set of PRB bundling sizes for the first set of two or more layers and a third set of PRB bundling sizes and a fourth set of PRB bundling sizes for the second set of two or more layers and receiving a second control message scheduling the downlink transmission and including a first indication of one of the first set of PRB bundling sizes or the second set of PRB bundling sizes and a second indication of one of the third set of PRB bundling sizes or the fourth set of PRB bundling sizes, where the first PRB bundling size may be from the first set of PRB bundling sizes or the second set of PRB bundling sizes based on the first indication, and the second PRB bundling size may be from the third set of PRB bundling sizes or the fourth set of PRB bundling sizes based on the second indication.

Some examples of the method, apparatuses, and non-transitory computer-readable medium described herein may further include operations, features, means, or instructions for determining the first PRB bundling size based on the second control message indicating the first set of PRB bundling sizes and a ratio of a size of the PRBs allocated to the first codeword and size of a bandwidth part associated with the first codeword.

Some examples of the method, apparatuses, and non-transitory computer-readable medium described herein may further include operations, features, means, or instructions for determining the first PRB bundling size based on the second control message indicating the second set of PRB bundling sizes, where the first PRB bundling size includes a PRB bundling size from the second set of PRB bundling sizes.

In some examples of the method, apparatuses, and non-transitory computer-readable medium described herein, the first set of PRB bundling sizes may be different from the third set of PRB bundling sizes and the second set of PRB bundling sizes may be different from the fourth set of PRB bundling sizes. In some examples of the method, apparatuses, and non-transitory computer-readable medium described herein, the first set of PRB bundling sizes may be the same as the third set of PRB bundling sizes and the second set of PRB bundling sizes may be the same as the fourth set of PRB bundling sizes.

In some examples of the method, apparatuses, and non-transitory computer-readable medium described herein, the first control message includes a common indication that the first PRB bundling size and the second PRB bundling size may be both configured as the dynamic bundling type.

In some examples of the method, apparatuses, and non-transitory computer-readable medium described herein, receiving the one or more control messages may include operations, features, means, or instructions for receiving a first control message indicating that the first PRB bundling size and the second PRB bundling size may be configured as a dynamic bundling type and receiving a second control message scheduling the downlink transmission and including a value that indicates two or more pairs of PRB bundling sizes corresponding to the first PRB bundling size and the second PRB bundling size.

In some examples of the method, apparatuses, and non-transitory computer-readable medium described herein, a mapping between the value and the two or more pairs of PRB bundling sizes may be configured via RRC signaling or may be preconfigured. In some examples of the method, apparatuses, and non-transitory computer-readable medium described herein, the value indicates that the second PRB bundling size may be a smaller PRB bundling size than the first PRB bundling size and the first set of two or more layers may be associated with a common data stream of the downlink transmission and the second set of two or more layers may be associated with a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, receiving the one or more control messages may include operations, features, means, or instructions for receiving a first control message indicating that the first PRB bundling size and the second PRB bundling size may be configured as a dynamic bundling type and further indicates a first set of PRB bundling sizes and a second set of PRB bundling sizes and receiving a second control message scheduling the downlink transmission and including a first indication of the first set of PRB bundling sizes or the second set of PRB bundling sizes, where the first PRB bundling size may be from the first set of PRB bundling sizes or the second set of PRB bundling sizes based on the indication, the second control message further including a second indication of whether the second PRB bundling size may be a same PRB bundling size as the first PRB bundling size.

In some examples of the method, apparatuses, and non-transitory computer-readable medium described herein, the second indication includes an indication that the second PRB bundling size may be the same PRB bundling size as the first PRB bundling size and the second PRB bundling size may be determined based on the first PRB bundling size and the second indication.

In some examples of the method, apparatuses, and non-transitory computer-readable medium described herein, the second indication includes an indication that the second PRB bundling size may be different from the first PRB bundling size and the second PRB bundling size may be determined based on the first PRB bundling size and the second indication.

In some examples of the method, apparatuses, and non-transitory computer-readable medium described herein, the first PRB bundling size may be at least one PRB bundling size increment greater than the second PRB bundling size based on the second indication, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, the second PRB bundling size includes a wideband PRB bundling size and the first PRB bundling size includes the wideband PRB bundling size based on the second PRB bundling size including the wideband PRB bundling size, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

Some examples of the method, apparatuses, and non-transitory computer-readable medium described herein may further include operations, features, means, or instructions for determining the second PRB bundling size based on the one or more control messages, where the first PRB bundling size includes a wideband PRB bundling size based on two or more PRBs associated with the downlink transmission being contiguous in a frequency domain, and where the first set of two or more layers may be associated with a common data stream of the downlink transmission and the second set of two or more layers may be associated with a private data stream of the downlink transmission, the private data stream being associated with downlink data for a first wireless device and the common data stream being associated with downlink data for the first wireless device and with downlink data for a second wireless device different from the first wireless device.

Some examples of the method, apparatuses, and non-transitory computer-readable medium described herein may further include operations, features, means, or instructions for determining the second PRB bundling size based on the one or more control messages and determining the first PRB bundling size based on two or more PRBs associated with the downlink transmission being non-contiguous in a frequency domain, where the first set of two or more layers corresponds to a common data stream of the downlink transmission and the second set of two or more layers corresponds to a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, the first PRB bundling size and the PRB bundling size may be a same PRB bundling size based on the two or more PRBs being non-contiguous.

In some examples of the method, apparatuses, and non-transitory computer-readable medium described herein, the first PRB bundling size includes a predetermined value.

In some examples of the method, apparatuses, and non-transitory computer-readable medium described herein, the two or more PRBs of the downlink transmission include at least one portion that may be contiguous in the frequency domain and the first PRB bundling size may be equal to a size of the contiguous portion of the two or more PRBs.

A method for wireless communications at a network entity is described. The method may include transmitting one or more control messages indicating a first PRB bundling size (e.g., a first PRG size) for a first set of two or more layers of a downlink shared channel and a second PRB bundling size (e.g., a second PRG size) for a second set of two or more layers of the downlink shared channel, the first set of two or more layers being different from the second set of two or more layers and transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

An apparatus for wireless communications at a network entity is described. The apparatus may include a processor, memory coupled with the processor, and instructions stored in the memory. The instructions may be executable by the processor to cause the apparatus to transmit one or more control messages indicating a first PRB bundling size for a first set of two or more layers of a downlink shared channel and a second PRB bundling size for a second set of two or more layers of the downlink shared channel, the first set of two or more layers being different from the second set of two or more layers and transmit, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

Another apparatus for wireless communications at a network entity is described. The apparatus may include means for transmitting one or more control messages indicating a first PRB bundling size for a first set of two or more layers of a downlink shared channel and a second PRB bundling size for a second set of two or more layers of the downlink shared channel, the first set of two or more layers being different from the second set of two or more layers and means for transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

A non-transitory computer-readable medium storing code for wireless communications at a network entity is described. The code may include instructions executable by a processor to transmit one or more control messages indicating a first PRB bundling size for a first set of two or more layers of a downlink shared channel and a second PRB bundling size for a second set of two or more layers of the downlink shared channel, the first set of two or more layers being different from the second set of two or more layers and transmit, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

In some examples of the method, apparatuses, and non-transitory computer-readable medium described herein, transmitting the one or more control messages may include operations, features, means, or instructions for transmitting a first control message indicating the first PRB bundling size and the second PRB bundling size, where the first PRB bundling size and the second PRB bundling size may be configured as a static bundling type.

In some examples of the method, apparatuses, and non-transitory computer-readable medium described herein, the first control message includes a common indication that the first PRB bundling size and the second PRB bundling size may be both configured as the static bundling type.

In some examples of the method, apparatuses, and non-transitory computer-readable medium described herein, transmitting the one or more control messages may include operations, features, means, or instructions for transmitting a first control message indicating the first PRB bundling size, the first PRB bundling size being configured as a static bundling type, where the first control message indicates that the second PRB bundling size may be configured as a dynamic bundling type and further indicates a first set of PRB bundling sizes and a second set of PRB bundling sizes and transmitting a second control message scheduling the downlink transmission and including an indication of one of the first set of PRB bundling sizes or the second set of PRB bundling sizes, where the second PRB bundling size may be from the first set of PRB bundling sizes or the second set of PRB bundling sizes based on the indication.

In some examples of the method, apparatuses, and non-transitory computer-readable medium described herein, the second PRB bundling size may be selected from the first set of PRB bundling sizes and the first set of PRB bundling sizes includes multiple PRB bundling sizes and the method, apparatuses, and non-transitory computer-readable medium may include further operations, features, means, or instructions for selecting the second PRB bundling size based on a size of PRBs allocated to the second codeword, a ratio of a size of the PRBs allocated to the second codeword and size of a bandwidth part associated with the second codeword, an MCS associated with the second set of two or more layers, a quantity of layers of the second set of two or more layers, or a combination thereof.

In some examples of the method, apparatuses, and non-transitory computer-readable medium described herein, the first set of two or more layers may be associated with a private data stream of the downlink transmission and the second set of two or more layers may be associated with a common data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, the first PRB bundling size may be selected from a set of two or more PRB bundling sizes and the method, apparatuses, and non-transitory computer-readable medium may include further operations, features, means, or instructions for selecting the second PRB bundling size based on the second control message and the first set of PRB bundling sizes or the second set of PRB bundling sizes and selecting that the first PRB bundling size may be the same PRB bundling size as the second PRB bundling size based on the second PRB bundling size being configured as the dynamic bundling type and the first control message indicating that the first PRB bundling size may be the same as the second PRB bundling size.

In some examples of the method, apparatuses, and non-transitory computer-readable medium described herein, the first set of two or more layers may be associated with a common data stream of the downlink transmission and the second set of two or more layers may be associated with a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, transmitting the one or more control messages may include operations, features, means, or instructions for transmitting a first control message indicating that the first PRB bundling size and the second PRB bundling size may be configured as a dynamic bundling type, where the first control message indicates a first set of PRB bundling sizes and a second set of PRB bundling sizes for the first set of two or more layers and a third set of PRB bundling sizes and a fourth set of PRB bundling sizes for the second set of two or more layers and transmitting a second control message scheduling the downlink transmission and including a first indication of one of the first set of PRB bundling sizes or the second set of PRB bundling sizes and a second indication of one of the third set of PRB bundling sizes or the fourth set of PRB bundling sizes, where the first PRB bundling size may be from the first set of PRB bundling sizes or the second set of PRB bundling sizes based on the first indication, and the second PRB bundling size may be from the third set of PRB bundling sizes or the fourth set of PRB bundling sizes based on the second indication.

Some examples of the method, apparatuses, and non-transitory computer-readable medium described herein may further include operations, features, means, or instructions for selecting the first PRB bundling size based on the second control message indicating the first set of PRB bundling sizes and a ratio of a size of the PRBs allocated to the first codeword and size of a bandwidth part associated with the first codeword.

Some examples of the method, apparatuses, and non-transitory computer-readable medium described herein may further include operations, features, means, or instructions for selecting the first PRB bundling size based on the second control message indicating the second set of PRB bundling sizes, where the first PRB bundling size includes a PRB bundling size from the second set of PRB bundling sizes.

In some examples of the method, apparatuses, and non-transitory computer-readable medium described herein, the first set of PRB bundling sizes may be different from the third set of PRB bundling sizes and the second set of PRB bundling sizes may be different from the fourth set of PRB bundling sizes.

In some examples of the method, apparatuses, and non-transitory computer-readable medium described herein, the first set of PRB bundling sizes may be the same as the third set of PRB bundling sizes and the second set of PRB bundling sizes may be the same as the fourth set of PRB bundling sizes.

In some examples of the method, apparatuses, and non-transitory computer-readable medium described herein, the first control message includes a common indication that the first PRB bundling size and the second PRB bundling size may be both configured as the dynamic bundling type.

In some examples of the method, apparatuses, and non-transitory computer-readable medium described herein, transmitting the one or more control messages may include operations, features, means, or instructions for transmitting a first control message indicating that the first PRB bundling size and the second PRB bundling size may be configured as a dynamic bundling type and transmitting a second control message scheduling the downlink transmission and including a value that indicates two or more pairs of PRB bundling sizes corresponding to the first PRB bundling size and the second PRB bundling size.

In some examples of the method, apparatuses, and non-transitory computer-readable medium described herein, a mapping between the value and the two or more pairs of PRB bundling sizes may be configured via RRC signaling or may be preconfigured.

In some examples of the method, apparatuses, and non-transitory computer-readable medium described herein, the value indicates that the second PRB bundling size may be a smaller PRB bundling size than the first PRB bundling size and the first set of two or more layers may be associated with a common data stream of the downlink transmission and the second set of two or more layers may be associated with a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, transmitting the one or more control messages may include operations, features, means, or instructions for transmitting a first control message indicating that the first PRB bundling size and the second PRB bundling size may be configured as a dynamic bundling type and further indicates a first set of PRB bundling sizes and a second set of PRB bundling sizes and transmitting a second control message scheduling the downlink transmission and including a first indication of the first set of PRB bundling sizes or the second set of PRB bundling sizes, where the first PRB bundling size may be from the first set of PRB bundling sizes or the second set of PRB bundling sizes based on the indication, the second control message further including a second indication of whether the second PRB bundling size may be a same PRB bundling size as the first PRB bundling size.

In some examples of the method, apparatuses, and non-transitory computer-readable medium described herein, the second indication includes an indication that the second PRB bundling size may be the same PRB bundling size as the first PRB bundling size and the second PRB bundling size may be selected based on the first PRB bundling size and the second indication.

In some examples of the method, apparatuses, and non-transitory computer-readable medium described herein, the second indication includes an indication that the second PRB bundling size may be different from the first PRB bundling size and the second PRB bundling size may be selected based on the first PRB bundling size and the second indication.

In some examples of the method, apparatuses, and non-transitory computer-readable medium described herein, the first PRB bundling size may be at least one PRB bundling size increment greater than the second PRB bundling size based on the second indication, the first set of two or more layers being associated with a common data stream of the downlink transmission, and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, the second PRB bundling size includes a wideband PRB bundling size and the first PRB bundling size includes the wideband PRB bundling size based on the second PRB bundling size including the wideband PRB bundling size, the first set of two or more layers being associated with a common data stream of the downlink transmission, and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

Some examples of the method, apparatuses, and non-transitory computer-readable medium described herein may further include operations, features, means, or instructions for selecting the second PRB bundling size based on the one or more control messages, where the first PRB bundling size includes a wideband PRB bundling size based on two or more PRB s associated with the downlink transmission being contiguous in a frequency domain, and where the first set of two or more layers may be associated with a common data stream of the downlink transmission and the second set of two or more layers may be associated with a private data stream of the downlink transmission, the private data stream being associated with downlink data for a first wireless device and the common data stream being associated with downlink data for the first wireless device and with downlink data for a second wireless device different from the first wireless device.

Some examples of the method, apparatuses, and non-transitory computer-readable medium described herein may further include operations, features, means, or instructions for selecting the second PRB bundling size based on the one or more control messages and selecting the first PRB bundling size based on two or more PRBs associated with the downlink transmission being non-contiguous in a frequency domain, where the first set of two or more layers corresponds to a common data stream of the downlink transmission and the second set of two or more layers corresponds to a private data stream of the downlink transmission, the private data stream being associated with downlink data for a first wireless device and the common data stream being associated with downlink data for the first wireless device and with downlink data for a second wireless device different from the first wireless device.

In some examples of the method, apparatuses, and non-transitory computer-readable medium described herein, the first PRB bundling size and the PRB bundling size may be a same PRB bundling size based on the two or more PRBs being non-contiguous.

In some examples of the method, apparatuses, and non-transitory computer-readable medium described herein, the first PRB bundling size includes a predetermined value.

In some examples of the method, apparatuses, and non-transitory computer-readable medium described herein, the two or more PRBs of the downlink transmission include at least one portion that may be contiguous in the frequency domain and the first PRB bundling size may be equal to a size of the contiguous portion of the two or more PRBs.

DETAILED DESCRIPTION

Figure 1:
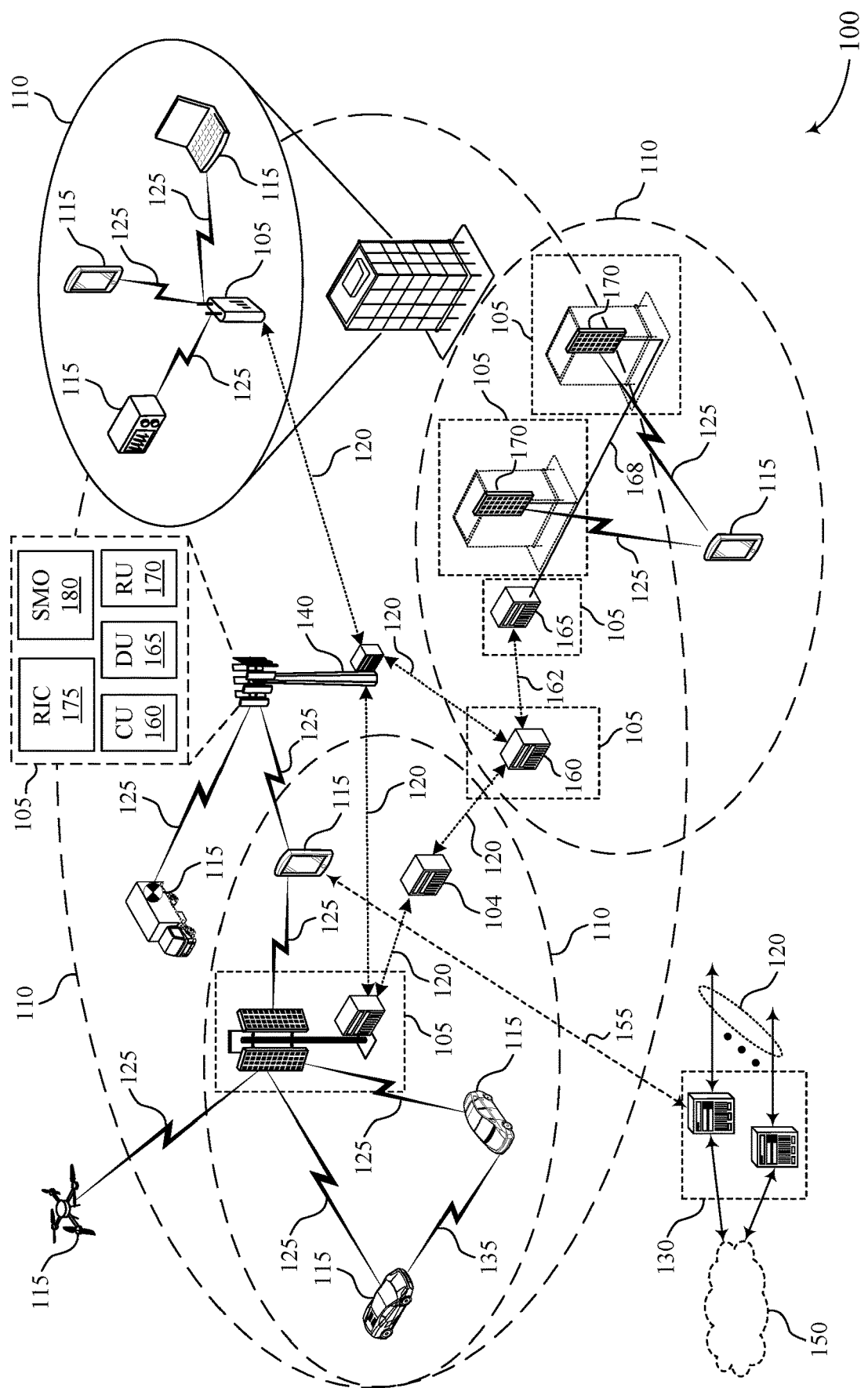
FIG. 1 illustrates an example of a wireless communications system that supports unequal precoding resource block group (PRG) sizes for multiple-codeword downlink data transmissions in accordance with one or more aspects of the present disclosure.

In some wireless communications systems, a transmitting device (e.g., a network entity) may apply a precoding matrix to a downlink transmission, and the downlink transmission may be configured on a set of resources, such as resource blocks. In some cases, the transmitting device may apply the same precoder across the entire transmission bandwidth in a downlink transmission. In other examples, different precoders may be used within partial bandwidths (e.g., parts of a wideband system bandwidth). A set of resources having a same precoding may be included in a precoding resource group (PRG) (which may also be referred to herein as a physical resource block (PRB) group, a precoding resource block group, or the like), and a size of the PRG (i.e., a bundle size) may refer to a quantity of resource blocks for which precoding is the same. The transmitting device may configure a PRG size (also referred to herein as a PRB bundling size) for transmitting a downlink transmission and may indicate the PRG size (e.g., dynamically, semi-statically) to a receiving device. The receiving device may receive the downlink transmission and may perform channel estimation in accordance with the PRG size.

In some examples, the transmitting device may transmit the downlink transmission via multiple layers or sets of layers. For example, for four or more layers, the transmitting device may map a first codeword of the downlink transmission to a first set of layers (e.g., a first set of two or more layers) and may map a second codeword of the downlink transmission to a second set of layers (e.g., a second set of two or more layers). In some examples, the transmitting device may support rate-splitting techniques, in which the transmitting device may split a data stream (e.g., of the downlink transmission) into multiple sub-streams that are separately encoded. For example, a first sub-stream may include data for the receiving device, and a second sub-stream may include data for the receiving device and one or more other devices. Here, the first codeword may correspond to the first sub-stream and the second codeword may correspond to the second sub-stream. In such scenarios, using a same PRG size for both codewords may result in suboptimal performance. For instance, using a relatively more granular precoding (e.g., a smaller PRG size) may reduce inter-device interference, but may not provide accurate channel estimation. In contrast, using a relatively greater PRG size may improve channel estimation accuracy, but may be associated with significantly increased interference. As such, using one or more different PRG sizes for different codewords (e.g., corresponding to different sets of layers) may provide improved channel estimation, thereby resulting in improved communications performance and throughput.

Accordingly, aspects of the present disclosure support different PRG sizes for different codewords of a multi-layer transmission. The transmitting device may configure a respective PRG size for each codeword and corresponding set of layers that provides optimal performance. For example, the transmitting device may configure a relatively small PRG size for the first set of layers to avoid interference from other devices, and the transmitting device may configure a relatively large PRG size for the second set of layers to ensure accurate channel estimation. The transmitting device may transmit control signaling to the receiving device to indicate the configured PRG sizes for each set of layers, for example, corresponding to each codeword. That is, the transmitting device may transmit multiple indications of PRG sizes to the receiving device, each indication of a PRG size corresponding to a set of layers. In some examples, the PRG sizes for the sets of layers may be dynamically configured, statically configured, or a combination thereof. The receiving device may determine the PRG size for each set of layers based on the indications and may receive and decode each codeword based on the corresponding PRG size.

Particular implementations of the subject matter described in this disclosure can be implemented to realize one or more of the following potential advantages. For example, by independently configuring sets of layers and corresponding codewords with respective PRG sizes, the transmitting device and the receiving device may communicate with increased reliability and efficiency. Additionally, because PRG size(s) impact inter-device interference levels and accurate channel estimation, techniques described herein may avoid performance degradation associated with using a same PRG size in multi-stream or multi-layer transmissions. Accordingly, various aspects of the present disclosure may provide for improved reliability and accuracy in wireless communications while reducing power consumption, reducing system latency, and increasing efficient utilization of communication resources, among other benefits, across various and diverse deployment scenarios.

Aspects of the disclosure are initially described in the context of wireless communications systems. Aspects of the disclosure are then discussed with reference to rate-splitting diagrams and a process flow. Aspects of the disclosure are further illustrated by and described with reference to apparatus diagrams, system diagrams, and flowcharts that relate to unequal PRG sizes for multiple-codeword downlink data transmissions.

FIG. 1 illustrates an example of a wireless communications system 100 that supports unequal PRG sizes for multiple-codeword downlink data transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support unequal PRG sizes for multiple-codeword downlink data transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communications system 100, a transmitting device, such as a network entity 105, may apply a precoder (e.g., a precoding matrix) to a downlink transmission (e.g., a downlink shared channel transmission, such as a physical downlink shared channel (PDSCH)), and the downlink transmission may be configured on a set of resources (e.g., resource blocks, subcarriers). A set of resources having a same precoding may be included in a precoding resource group (PRG) (which may also be referred to herein as a physical resource block (PRB) group, a precoding resource block group, or the like), and a size of the PRG may refer to a quantity of resource blocks for which the precoding is the same. The PRG size may also be referred to as a bundle size or a PRB bundling size. Additionally, a PRB bundling size may vary according to one or more PRG size configurations, and a PRB bundling size may refer to a precoding granularity. For example, a first PRG configuration may have a granularity of two resource blocks, whereas a second PRG configuration may have a granularity of four resource blocks. In some scenarios, the network entity 105 may apply a same precoder to all resource blocks allocated to a downlink transmission, which may be an example of a wideband PRB bundling size.

In some examples, the network entity 105 may transmit control signaling (e.g., RRC signaling, DCI, or the like) to a receiving device, such as a UE 115, to indicate a configured PRB bundling size (e.g., P') for a downlink transmission. For instance, the network entity 105 may configure a PRB bundling size for downlink data transmissions and/or reference signals. Additionally, the network entity 105 may configure a PRB bundling type (e.g., prb-BundlingType), such as a static bundling type or a dynamic bundling type. For example, the network entity 105 may statically configure the PRB bundling size for the downlink transmission. The network entity 105 may transmit control signaling (e.g., RRC signaling) to the UE 115 that indicates the static bundling type (e.g., prb-BundlingType is equal to staticBundling) and indicates the PRB bundling size (e.g., bundleSize). Example PRB bundling sizes indicated by the control signaling may include, but are not limited to, 2, 4, or wideband.

In other cases, the network entity 105 may dynamically configure the PRB bundling size. Here, the network entity 105 may indicate one or more sets of candidate PRB bundling sizes via RRC signaling, and may indicate one of the sets of candidate PRB bundling sizes via DCI. For example, the network entity 105 may transmit an RRC message to the UE 115 that indicates a dynamic bundling type (e.g., prb-BundlingType is equal to dynamicBundling). The RRC message may further include an indication of a first set of PRB bundling sizes (e.g., bundleSizeSet1) and a second set of PRB bundling sizes (e.g., bundleSizeSet2). The first set of PRB bundling sizes may include one PRB bundling size (e.g., 4 or wideband) or two PRB bundling sizes (e.g., 2 and wideband, 4 and wideband) and the second set of PRB bundling sizes may include one PRB bundling size (e.g., 4 or wideband).

The network entity 105 may transmit DCI to the UE 115 that schedules the downlink transmission and indicates either the first set or the second set of PRB bundling sizes. For example, the DCI may include a one-bit field (e.g., a PRB bundling size indicator field), the value of which may be used by the UE 115 to determine the configured PRB bundling size for the downlink transmission. If the value is equal to zero, the configured PRB bundling size may be equal to the value in the second set of PRB bundling sizes (e.g., bundleSizeSet2). If the value is equal to one, the UE 115 may determine the configured PRB bundling size based on the first set of PRB bundling sizes. More specifically, if the first set of PRB bundling sizes (e.g., bundleSizeSet1) includes only one PRB bundling size, the UE 115 may determine that the configured PRB bundling size is equal to the PRB bundling size in the first set of PRB bundling sizes.

If, however, the first set of PRB bundling sizes includes two (or more) PRB bundling sizes, the UE 115 may determine which of the PRB bundling sizes to use based on one or more other parameters. For instance, the first set of PRB bundling sizes may include a fixed value (e.g., 2 or 4) and a wideband PRB bundling size. If the downlink transmission is scheduled across a set of contiguous PRBs, and the size of the scheduled PRBs is greater than half of a size of an associated bandwidth part, the UE 115 may determine that the configured PRB bundling size is wideband. Alternatively (e.g., if the scheduled PRBs are non-contiguous, or the size is less than half of the associated bandwidth part), the UE 115 may determine that the configured PRB bundling size is the other configured value in the first set of PRB bundling sizes (e.g., 2 or 4).

The network entity 105 may transmit the downlink transmission to the UE 115 in accordance with the configured PRB bundling size. The UE 115 may use the configured PRB bundling size to perform channel estimation on the received downlink transmission. For example, the UE 115 may perform channel measurements on the downlink transmission and may determine (e.g., calculate) one or more channel estimation parameters using the configured PRB bundling size.

In some examples, the network entity 105 may transmit the downlink transmission via multiple layers or sets of layers. For example, the network entity 105 and the UE 115 may support MIMO operations, such as MU-MIMO operations, and the network entity 105 may transmit the downlink transmission using four or more layers. In such examples, the network entity 105 may map different codewords of the downlink transmission to different sets of layers. The network entity 105 may map a first codeword of the downlink transmission to a first set of layers (e.g., a first set of two or more layers) and may map a second codeword of the downlink transmission to a second set of layers (e.g., a second set of two or more layers).

In some cases, the downlink transmission may include or be an example of one or more reference signals, such as demodulation reference signals (DMRSs) (e.g., DMRS for PDSCH). The network entity 105 may transmit the DMRSs using one or more antenna ports, which in some aspects may be referred to as DMRS ports. A DMRS port may correspond to a set of layers. Additionally, or alternatively, the DMRS ports may correspond to one or more antenna elements used for forming directional beams. The network entity 105 may map the first codeword to a first set of DMRS ports and the second codeword to a second set of DMRS ports.

The network entity 105 may configure each codeword with a respective set of parameters and may indicate the parameters in the DCI scheduling the downlink transmission. For example, the DCI may have separate fields to indicate a respective modulation and coding scheme (MCS), a new data indicator, and a redundancy version for each codeword. Additionally, some parameters may be the same for both the first codeword and the second codeword, such as a HARQ identifier (ID), a frequency domain resource allocation (FDRA), a time domain resource allocation (TDRA), or the like.

Additionally, the network entity 105 may support rate-splitting techniques, in which the network entity 105 may split a data stream (e.g., of the downlink transmission) into multiple sub-streams that are separately encoded. In MU-MIMO scenarios, the network entity 105 may split data streams for multiple receiving devices into multiple sub-streams. The network entity 105 may maintain some device-specific sub-streams, which may be referred to as private streams, and may include data associated with a single receiving device. The network entity 105 may also create a shared sub-stream by re-combining sub-streams associated with different devices into a single sub-stream, referred to as a common stream; here, the common stream may include data associated with two or more receiving devices. For example, a first sub-stream may include data for the UE 115, and a second sub-stream may include data for the UE 115 and one or more other devices.

In such examples, the first codeword may correspond to a common stream and the second codeword may correspond to a private stream. The UE 115 may receive the downlink transmission including both codewords and may decode the codewords based on one or more channel estimates. For instance, the UE 115 may perform a channel estimation based on the common stream and may use the channel estimation to decode the first codeword. The UE 115 may perform interference cancellation (e.g., based on the performed channel estimation and the decoded common stream/codeword) for the private stream to decode the second codeword.

According to the techniques described herein, the network entity 105 may configure different PRB bundling sizes for each set of layers of a multi-layer downlink transmission to the UE 115, and may map codewords of the downlink transmission to the sets of layers. For example, the network entity 105 may determine or otherwise identify a first set of layers and a second set of layers (e.g., different from the first set of layers) of a downlink shared channel. Each set of layers may include two or more layers. In a rate-splitting scenario, the sets of layers may each correspond to a private data stream or a common data stream. For instance, the first set of layers may correspond to a private stream that includes data for the UE 115, while the second set of layers may correspond to a common stream that includes data for the UE 115 and data for one or more other receiving devices (e.g., one or more other UEs 115).

The network entity 105 may determine a first PRB bundling size for the first set of layers and a second PRB bundling size for the second set of layers. In some examples, the first PRB bundling size and the second PRB bundling size may not be equal to one another. For example, the first PRB bundling size may be smaller than the second PRB bundling size. The network entity 105 may map a first codeword of the downlink transmission to the first set of layers and a second codeword of the downlink transmission to the second set of layers.

The network entity 105 may transmit control signaling to the UE 115 that indicates the first PRB bundling size for the first set of layers and the second PRB bundling size for the second set of layers. In some cases, the network entity 105 may configure the first PRB bundling size and the second PRB bundling size according to a bundling type (e.g., a static bundling type, a dynamic bundling type). For example, the network entity 105 may configure the first PRB bundling size as a static bundling type and the second PRB bundling size as a dynamic bundling type. The network entity 105 may transmit an RRC message to the UE 115 indicating the first PRB bundling size and indicating multiple sets of PRB bundling sizes associated with the second PRB bundling size. Additionally, the network entity 105 may transmit DCI to the UE 115 indicating one of the multiple sets of PRB bundling sizes, and the UE 115 may determine the second PRB bundling size from the indicated set of PRB bundling sizes.

Alternatively, both the first PRB bundling size and the second PRB bundling size may be configured as a same bundling type, e.g., both may be configured as a static bundling type or both may be configured as a dynamic bundling type. The network entity 105 may transmit associated control signaling (e.g., RRC, DCI) to the UE 115 in accordance with the bundling type(s) to indicate the first PRB bundling size and the second PRB bundling size.

The network entity 105 may transmit the downlink transmission including the first codeword corresponding to the first set of layers and the second codeword corresponding to the second set of layers. The UE 115 may receive the control signaling and the downlink transmission and may decode the first codeword and the second codeword based on the corresponding PRB bundling sizes. For example, the UE 115 may obtain one or more channel estimates using the first PRB bundling size and the second PRB bundling size, and may utilize the one or more channel estimates during decoding. As a specific, non-limiting example, the UE 115 may perform a first channel estimation associated with the first set of layers using the first PRB bundling size; the UE 115 may decode the first codeword based on the first channel estimation. The UE 115 may additionally perform a second channel estimation associated with the second set of layers using the second PRB bundling size, and the UE 115 may decode the second codeword based on the second channel estimation.

Figure 2:
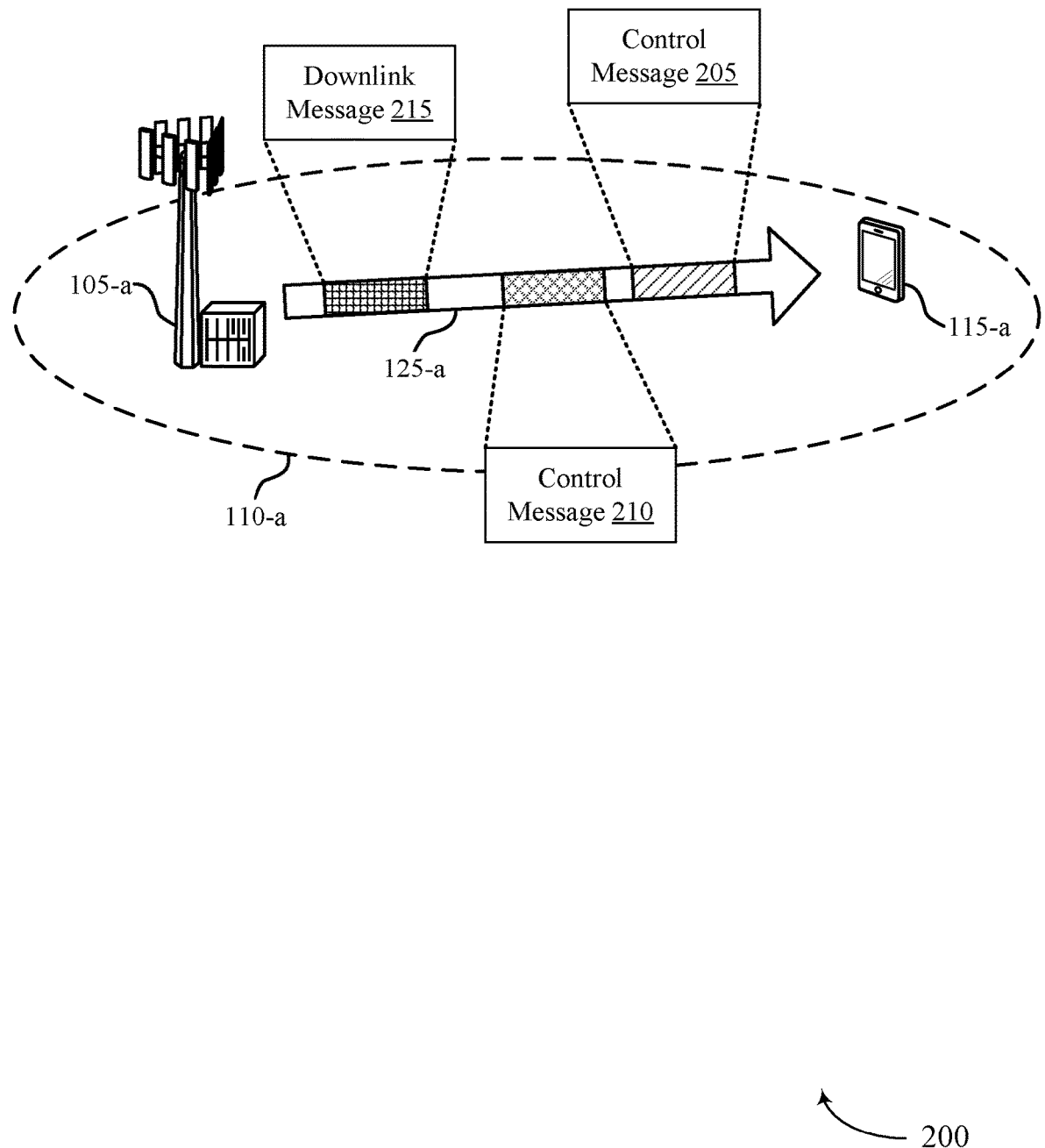
FIG. 2 illustrates an example of a wireless communications system that supports unequal PRG sizes for multiple-codeword downlink data transmissions in accordance with one or more aspects of the present disclosure.

FIG. 2 illustrates an example of a wireless communications system 200 that supports unequal PRG sizes for multiple-codeword downlink data transmissions in accordance with one or more aspects of the present disclosure. In some examples, wireless communications system 200 may implement aspects of wireless communications system 100. For instance, wireless communications system 200 includes a UE 115-a and a network entity 105-a, which may be examples of the corresponding devices described with reference to FIG. 1. Additionally, or alternatively, the UE 115 may be examples of a CPE, a relay node, a repeater, a router, an IAB node, or the like. Similarly, the network entity 105-a may be an example of a backhaul node, an IAB node, or the like. Thus, although aspects of the present disclosure are described with reference to a UE 115 and a network entity 105, it is understood that the described techniques may be performed by a wireless device different from a UE 115 and a network entity 105. Stated another way, operations performed by the UE 115-a and the network entity 105-a may be respectively performed by a UE 115, a network entity 105, or another wireless device, and the example shown is not to be construed as limiting. Likewise, the techniques described herein may be performed by two or more UEs 115, for example, communicating via sidelink communications, among other examples.

The network entity 105-a may communicate with the UE 115-a in a coverage area 110-a and via a downlink communication link 125-a, which may be an example of or include one or more downlink channels (e.g., PDSCH, physical downlink control channels (PDCCH)). For example, the network entity 105-a may transmit control messages 205 and 210 to the UE 115-a via a downlink control channel (e.g., PDCCH), and may transmit a downlink message 215 to the UE 115-a via a downlink shared channel (e.g., PDSCH). The network entity 105-a may transmit the downlink message 215 using multiple layers, which may, in some examples, correspond to multiple antenna ports (e.g., DMRS ports). For example, for more than four layers, the network entity 105-a may map a first codeword of the downlink message 215 to a first set of two or more layers and may map a second codeword of the downlink message 215 to a second set of two or more layers. The network entity 105-a may configure the first set of layers with a first PRB bundling size and the second set of layers with a second PRB bundling size.

In some examples, such as when the network entity 105-a implements rate-splitting techniques as described in greater detail with reference to FIGS. 3A and 3B, the first set of layers may correspond to a common stream of the downlink message 215 and the first codeword may be a common codeword (e.g., a common transport block). Further, the second set of layers may correspond to a private stream of the downlink message 215 and the second codeword may be a private codeword (e.g., a private transport block). Additionally, or alternatively, the first set of layers may correspond to the private stream and the second set of layers may correspond to the common stream.

The network entity 105-a may schedule the downlink message 215 by transmitting DCI to the UE 115-a. For instance, the control message 205 or the control message 210 may include or be an example of DCI that indicates scheduling information for the downlink message 215. The scheduling information may include a quantity of resource blocks (e.g., PRBs) over which the downlink message 215 is scheduled to be transmitted. In some cases, the quantity of resource blocks may be contiguous in a frequency domain. In other cases, some or all of the quantity of resource blocks may be non-contiguous in the frequency domain. In the latter example, portions of the scheduled resource blocks may be contiguous in the frequency domain. For instance, subsets of two or more resource blocks of the scheduled resource blocks may be contiguous in the frequency domain even if the entire quantity of scheduled resource blocks is non-contiguous.

The network entity 105-a may indicate the configured PRB bundling sizes (e.g., the first PRB bundling size and the second PRB bundling size) for the downlink message 215 via the control message 205, the control message 210, or both. For instance, the network entity 105-a may indicate the first PRB bundling size and/or the second PRB bundling size in the same message that schedules the downlink message 215. In some cases, the network entity 105-a may also indicate a configured bundling type (e.g., a static bundling type, a dynamic bundling type) for the first PRB bundling size and the second PRB bundling size.

For example, in some cases, the network entity 105-a may independently configure the first PRB bundling size for the first set of layers and the second PRB bundling size for the second set of layers. Put another way, each set of layers of the downlink message 215 may be associated with a respective PRB bundling size configuration (e.g., prb-BundlingType), which may include a bundling type and a set of one or more PRB bundling sizes. The PRB bundling size for a set of layers may be determined (e.g., by the network entity 105-a and/or the UE 115-a) separately from the PRB bundling size for another set of layers.

In the example of FIG. 2, the first set of layers may be associated with a first PRB bundling size configuration and the second set of layers may be associated with a second PRB bundling size configuration. For example, the first PRB bundling size and the second PRB bundling size may both be configured as the static bundling type and may be RRC-configured by the network entity 105-a. Here, the network entity 105-a may indicate the first PRB bundling size and the second PRB bundling size in the control message 205, which may be an example of an RRC message. The control message 205 may include, for example, a first bundleSize parameter and a second bundleSize parameter indicating the first and second PRB bundling sizes, respectively. In some cases, the control message 205 may further include a common indication that the first PRB bundling size and the second PRB bundling size are configured as the static bundling type.

The UE 115-a may receive the control message 205 and may determine or otherwise identify the first PRB bundling size and the second PRB bundling size based on the indications in the control message 205. The UE 115-a may receive and decode the downlink message 215 based on the control message 205, the first PRB bundling size, and the second PRB bundling size. For example, the UE 115-a may estimate the downlink shared channel over which the downlink message 215 is transmitted using the first PRB bundling size and the second PRB bundling size, e.g., by performing measurements or calculations using the first and second PRB bundling sizes. The UE 115-a may decode the first codeword based on the channel estimate(s) using the first PRB bundling size and may decode the second codeword based on one or more channel estimates using the second PRB bundling size.

As another example, the first PRB bundling size and the second PRB bundling size may both be configured as the dynamic bundling type. In this example, the control message 205 may be an example of an RRC message and the control message 210 may be an example of DCI (and may schedule the downlink message 215). The control message 205 may indicate sets of PRB bundling sizes (e.g., bundleSizeSet parameters, each including one or more PRB bundling sizes) associated with each set of layers. For instance, the control message 205 may include a first set of PRB bundling sizes and a second set of PRB bundling sizes for the first set of layers, and a third set of PRB bundling sizes and a fourth set of PRB bundling sizes for the second set of layers; the third and fourth sets of PRB bundling sizes may be the same as or different from the first and second sets of PRB bundling sizes, respectively. The control message 210 may include a PRB bundling size indicator (e.g., a PRB bundling size indicator bit field) for each set of layers. The PRB bundling size indicator for the first set of layers may indicate the first set of PRB bundling sizes or the second set of PRB bundling sizes, while the PRB bundling size indicator for the second set of layers may indicate the third set of PRB bundling sizes or the fourth set of PRB bundling sizes.

Based on the PRB bundling size indicators in the control message 210, the UE 115-*a* may determine the first PRB bundling size and the second PRB bundling size. For example, if the PRB bundling size indicator for the first set of layers indicates the first set of PRB bundling sizes, and the first set of PRB bundling sizes includes two (or more) PRB bundling sizes (e.g., wideband and 2, wideband and 4), the UE 115-*a* may determine which of the two (or more) PRB bundling sizes to use for the first codeword (e.g., which PRB bundling size is the first PRB bundling size). In some cases, the UE 115-*a* may determine which PRB bundling size to use for the first PRB bundling size based on scheduling information for the downlink message 215. Here, the UE 115-*a* may use the wideband PRB bundling size if a size of the scheduled resource blocks is greater than half of a bandwidth part associated with the downlink message 215; otherwise, the UE 115-*a* may use the other value indicated in the first set of PRB bundling sizes. Additionally, or alternatively, the UE 115-*a* may determine which PRB bundling size to use as the first PRB bundling size based on an absolute size of the scheduled resource blocks, an MCS for the first set of layers, or a quantity of layers of the first set of layers.

In some cases, the control message 210 may include one field (e.g., a single field) with one or more bits that indicate both the first PRB bundling size and the second PRB bundling size, e.g., jointly indicates the first PRB bundling size and the second PRB bundling size. As an example, the field may include multiple bits that indicate a PRB bundling size pair by indicating a set of codepoint values that maps to a pair of PRB bundling sizes. As a non-limiting example, the field may include two bits, where a value of the first bit corresponds to the first PRB bundling size and a value of the second bit corresponds to the second PRB bundling size. Table 1 includes possible mappings between codepoint values and PRB bundling size pairs. In Table 1, the first value in a PRB bundling size pair may correspond to the first PRB bundling size, and the second value in a PRB bundling size pair may correspond to the second PRB bundling size.

TABLE 1

| Codepoint Values | PRB Bundling Size Pairs |
| --- | --- |
| 00 | (2, 4) |
| 01 | (2, wideband) |

TABLE 1-continued

| Codepoint Values | PRB Bundling Size Pairs |
| --- | --- |
| 10 | (4, 4) |
| 11 | (wideband, wideband) |

A mapping between the codepoint values and the PRB bundling sizes may be fixed or may be RRC-configured. In the latter example, the network entity 105-*a* may transmit an RRC message (e.g., the control message 205) to indicate a mapping between the codepoint values and PRB bundling size pairs, and then may dynamically configure a set of codepoint values to use for a given downlink transmission via an indication in DCI (e.g., the control message 210).

In general, the network entity 105-*a* may indicate a statically-configured PRB bundling size via an indication in an RRC message, such as the control message 205. The network entity 105-*a* may indicate a dynamically-configured PRB bundling size by configuring one or more sets of PRB bundling sizes in an RRC message (e.g., the control message 205) and dynamically indicating a PRB bundling size (e.g., on a per-transmission basis) in a DCI message (e.g., the control message 210). For example, the first PRB bundling size for the first set of layers may be statically configured (e.g., may be configured as a static bundling type), while the second PRB bundling size for the second set of layers may be dynamically configured (e.g., may be configured as a dynamic bundling type). Alternatively, the first PRB bundling size for the first set of layers may be configured as the dynamic bundling type, while the second PRB bundling size for the second set of layers may be configured as the static bundling type. The network entity 105-*a* may separately indicate the first PRB bundling size and the second PRB bundling size to the UE 115-*a* using corresponding control messages and based on the corresponding bundling type.

In some cases, each set of layers may be associated with a respective PRB bundling size, but the PRB bundling size for a set of layers may depend on a PRB bundling size for another set of layers. For example, the first PRB bundling size may be dynamically configured and the second PRB bundling size may be statically configured to be the same as the first PRB bundling size. The control message 205 configuring the second PRB bundling size may indicate that the second PRB bundling size is the same as the first PRB bundling size. Based on the control message 205, the UE 115-*a* may use the indication of the first PRB bundling size in the control message 210 to determine the second PRB bundling size. Put another way, the indication of the first PRB bundling size in the control message 210 may further indicate the second PRB bundling size.

As another example, the control message 210 indicating the first PRB bundling size may include an additional field corresponding to the second PRB bundling size. The additional field may indicate whether the second PRB bundling size is the same as the first PRB bundling size and the UE 115-*a* may determine the second PRB bundling size based on the first PRB bundling size (e.g., indicated in the control message 210). For example, if the additional field has a value of 0, the UE 115-*a* may determine that the second PRB bundling size is the same as the (indicated) first PRB bundling size. If the additional field has a value of 1, the UE 115-*a* may determine that the second PRB bundling size is an increment greater than the first PRB bundling size. For instance, if the control message 210 indicates that the first PRB bundling size is 2, the UE 115-*a* may determine that the second PRB bundling size is 4. If the control message 210 indicates that the first PRB bundling size is 4, the UE 115-a may determine that the second PRB bundling size is a wideband PRB bundling size.

Additionally, or alternatively, a PRB bundling size may be determined and/or indicated (e.g., by the network entity 105-a and the UE 115-a) based on whether the corresponding set of layers is associated with a common stream or a private stream of the downlink message 215. For example, the first set of layers may correspond to a common stream and may be dynamically configured based on multiple sets of PRB bundling sizes. The control message 210 may indicate that the UE 115-a is to use a PRB bundling size from a first set of PRB bundling sizes, where the first set of PRB bundling sizes may include two PRB bundling sizes (e.g., 2 and wideband, 4 and wideband). The UE 115-a may determine which of the two PRB bundling sizes to use as the first PRB bundling size based on a ratio of the size of scheduled PRBs to the bandwidth part, an absolute size of the scheduled resource blocks, an MCS for the first set of layers, or a quantity of layers of the first set of layers.

In another example, the set of layers corresponding to the common stream may be statically configured (e.g., via RRC), while the set of layers corresponding to the private stream may be dynamically or statically configured. In one example, the PRB bundling size for the common stream may always be a static value (e.g., wideband), whereas the PRB bundling size for the private stream may be configured from one or more sets of PRB bundling sizes (e.g., dynamically, semi-statically). Put another way, the set of layers corresponding to the common stream may be configured with a PRB bundling size from a set of PRB bundling sizes, and may, in some examples, be the same as the PRB bundling size for the private stream. Here, the RRC message (e.g., the control message 205) indicating the PRB bundling size associated with the common stream may include an indication that the PRB bundling size for the common stream is the same as the PRB bundling size for the private stream. The UE 115-a may determine the PRB bundling size for the common stream based on the PRB bundling size for the private stream.

In some cases, the UE 115-a may determine the PRB bundling size for the common stream based on the scheduling information for the downlink message 215. For example, the UE 115-a may determine whether the scheduled resource blocks are contiguous in the frequency domain; if so, the UE 115-a may assume that the PRB bundling size for the common stream is a wideband PRB bundling size. If the scheduled resource blocks are non-contiguous, the UE 115-a may determine that the PRB bundling size for the common stream is the same as the PRB bundling size for the private stream, or may determine that the PRB bundling size for the common stream is a fixed or preconfigured value, such as 2 or 4. In some cases, one or more subsets of resource blocks (e.g., including at least two resource blocks) may be contiguous, and the UE 115-a may determine that the PRB bundling size for each contiguous subset of resource blocks is equal to a size of the contiguous subset of resource blocks.

Figure 3A:
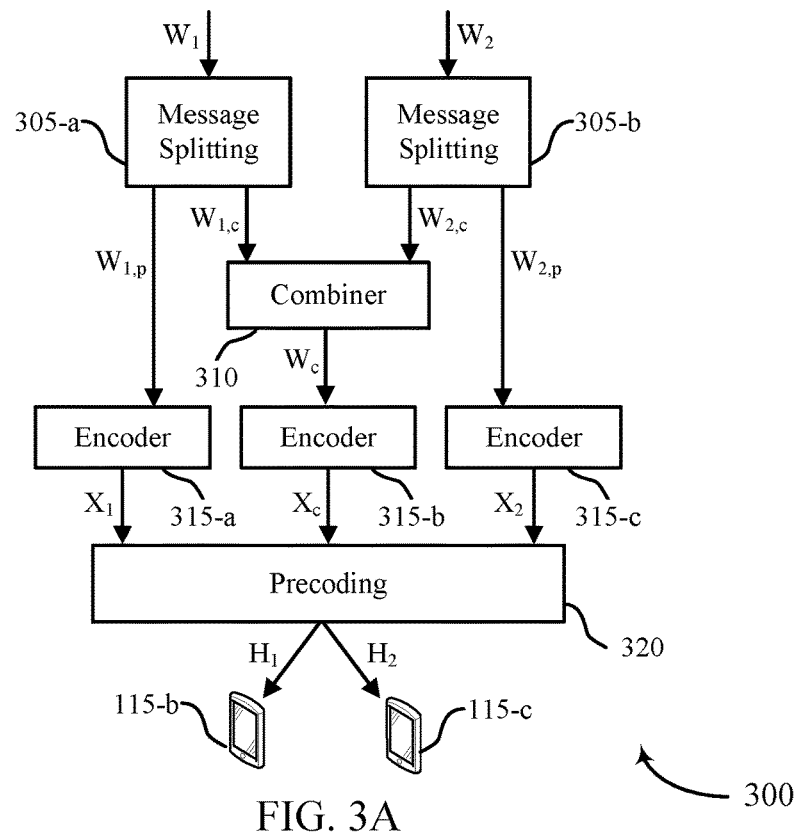
FIGS. 3A and 3B illustrate examples of rate-splitting diagrams that support unequal PRG sizes for multiple-codeword downlink data transmissions in accordance with one or more aspects of the present disclosure.
Figure 3B:
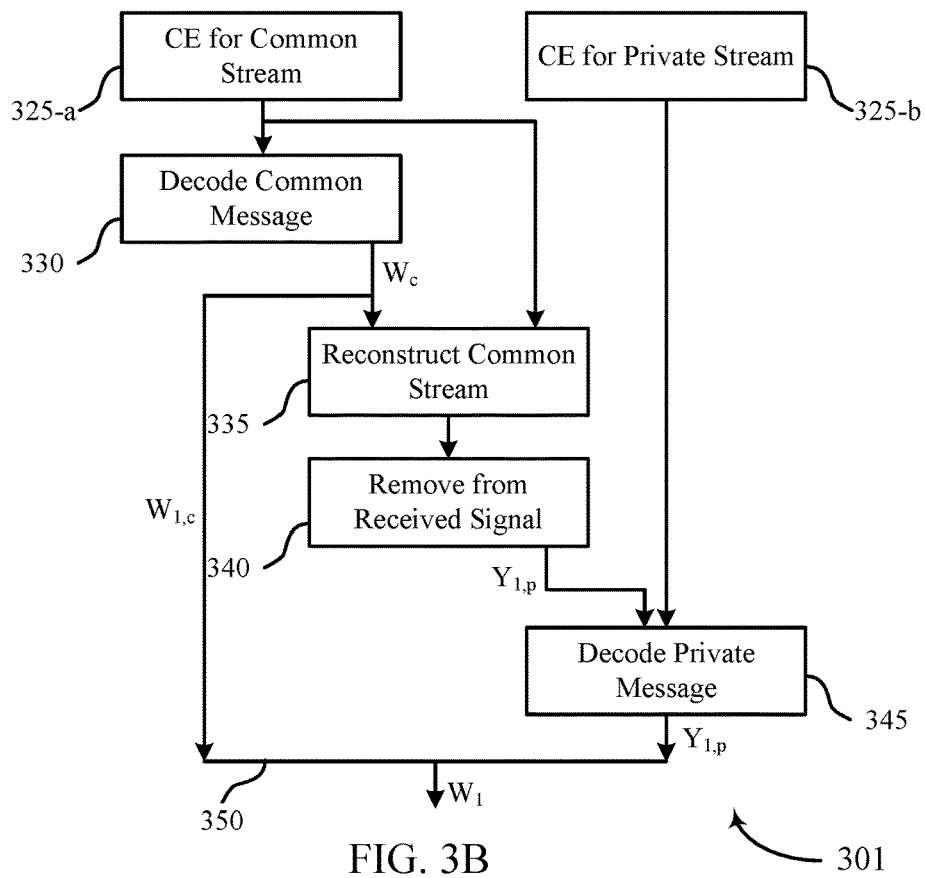

FIGS. 3A and 3B illustrate examples of rate-splitting diagrams 300 and 301 that support unequal PRG sizes for multiple-codeword downlink data transmissions in accordance with one or more aspects of the present disclosure. The rate-splitting diagrams 300 and 301 may be implemented to realize aspects of the wireless communications system 100 or the wireless communications system 200. For example, a network entity and one or more UEs (e.g., a network entity 105 and one or more UEs 115, respectively, as described with reference to FIGS. 1 and 2), may perform one or more operations of the rate-splitting diagrams 300 and 301 to transmit and receive multi-layer messages, where each set of layers of the message may be configured with a respective PRB bundling size.

In some scenarios, the network entity may lower a coding rate of a data stream by splitting the data stream into multiple data sub-streams and processing the data sub-streams at different layers. Such techniques may be referred to as rate-splitting. For example, the network entity may split a data stream into W data sub-streams and may synchronously encode and modulate bits of the W sub-streams. By splitting the data stream, the network entity may reduce the average code rate per layer. For example, the code rate per layer may be reduced to R/W, where R is the code rate for a non-split data stream, and W is the number of layers of the split data stream. In some examples, the network entity may use a different code rate or encoder for each layer.

Rate-splitting may be applied in MU-MIMO operations, where the network entity may split data streams for multiple receiving devices (e.g., UEs) into common and private streams. More specifically, the network entity may split messages for the UEs into multiple portions. The network entity may encode and modulate a portion of a message for a first UE to a first sub-stream, which may be referred to as a private stream (e.g., because the first sub-stream includes data associated with only the first UE). The network entity may encode and modulate portions of other messages for other UEs to obtain additional private streams. Additionally, the network entity may combine (i.e., concatenate) portions of the individual messages for each UE into a common message and may encode and modulate the common message to a common stream; the common stream may include data associated with multiple UEs. The network entity may transmit each private stream to the corresponding UE and may transmit the common stream to all of the multiple UEs. A UE receiving a corresponding private stream and the common stream may decode the private message and the common message. In some cases, the UE may decode the common message first, and may use the decoded common message in combination with one or more channel estimates to decode the private message.

FIG. 3A illustrates an example rate-splitting diagram 300 in which a network entity may apply rate-splitting for downlink transmissions to a UE 115-b and a UE 115-c. The network entity may have a message $W_1$ for transmission to the UE 115-b and a message $W_2$ for transmission to the UE 115-c. At 305-a, the message $W_1$ may be split into two portions, a private portion $W_{1,p}$ and a common portion $W_{1,c}$. Additionally, at 305-b, the message $W_2$ may be split into two portions, a private portion $W_{2,p}$ and a common portion $W_{2,c}$. The private portions $W_{1,p}$ and $W_{2,p}$ may be referred to as private messages, as they each contain data associated with a single UE 115 (e.g., the UE 115-b and the UE 115-c, respectively). At 310, the network entity may combine (i.e., concatenate) the common portions $W_{1,c}$ and $W_{2,c}$ to obtain a common message $W_c$ that includes data from both of the messages $W_1$ and $W_2$. Put another way, the common message $W_c$ includes data associated with both the UE 115-b and the UE 115-c.

At 315, the network entity may separately encode and modulate the private messages $W_{1,p}$ and $W_{2,p}$ and the common message $W_c$. For example, at 315-a, the network entity may encode and modulate the private message $W_{1,p}$ to a private stream $X_1$ (e.g., including a private codeword corresponding to the private message $W_{1,p}$) for the UE 115-b. At 315-c, the network entity may encode and modulate the private message $W_{2,p}$ to a private stream X2 (e.g., including a private codeword corresponding to the private message $W_{2,p}$) for the UE 115-c. At 315-b, the network entity may encode and modulate the common message $W_c$ to a common stream $X_c$ (e.g., including a common codeword corresponding to the common message $W_c$). Additionally, at 315, the network entity may map the private streams $X_1$ and $X_2$ and the common stream $X_c$ to respective sets of layers. For example, the network entity may map the private stream $X_1$ to a first set of layers (e.g., including two or more layers), the common stream $X_c$ to a second set of layers (e.g., including two or more layers), and the private stream $X_2$ to a third set of layers (e.g., including two or more layers).

At 320, the network entity may precode the private streams $X_1$ and $X_2$ and the common stream $X_c$. For example, the network entity may apply a precoding matrix, represented by $P_1$, to the private stream $X_1$. The network entity may apply a precoding matrix $P_2$ to the private stream $X_2$ and a precoding matrix $P_c$ to the common stream $X_c$. In some cases, the precoding matrices $P_1$, $P_2$, and $P_c$ may be the same, while in other examples, the precoding matrices may be different. According to the techniques described herein, for example, the network entity may apply each precoding matrix P using a respective PRB bundling size. That is, the network entity may independently configure a PRB bundling size for each stream X and may precode each stream X in accordance with the configured PRB bundling size. Further, as described with reference to FIG. 2, the network entity may transmit control signaling to the UEs 115 to indicate the PRB bundling sizes for each stream X.

In some examples, the network entity may configure a PRB bundling size for the common stream $X_c$ that is relatively greater than a PRB bundling size for the private stream $X_1$ and a PRB bundling size for the private stream $X_2$. The common stream $X_c$ may be received and decoded by multiple UEs 115 (e.g., the UE 115-b and the UE 115-c), such that the network entity may transmit the common stream $X_c$ using relatively wide beamforming (e.g., omni-directional beamforming); accordingly, the common stream $X_c$ may be precoded using a relatively large PRB bundling size (e.g., a wideband PRB bundling size). Alternatively, more granular precoding may reduce inter-UE interference for each private stream $X_1$ and $X_2$, and the network entity may precode the private streams $X_1$ and $X_2$ using a relatively small PRB bundling size.

After precoding, the network entity may transmit the streams $X_c$, $X_1$, and $X_2$ to the UE 115-b and the UE 115-c via downlink channels $H_1$ and $H_2$, respectively. The transmitted signal X may be represented by Equation 1 below.

$$X = P_c X_c + P_1 X_1 + P_2 X_2 \quad (1)$$

The signal Y received at each UE may be equal to the transmitted signal X modified by the corresponding channel H and noise N. For example, the signal $Y_1$ received at the UE 115-b may be represented by Equation 2 below.

$$Y_1 = H_1 P_c X_c + H_1 P_1 X_1 + H_1 P_2 X_2 + N_1 \quad (2)$$

FIG. 3B illustrates an example rate-splitting diagram 301 in which the UE 115-b may receive, via the downlink channel $H_1$, a downlink transmission including the common stream $X_c$ and the private streams $X_1$ and $X_2$. The UE 115-b may decode the downlink transmission according to the configured PRB bundling sizes for each stream X in order to obtain the private message $W_1$ (e.g., including the data associated with the UE 115-b). For example, at 325-a, the UE 115-b may perform a channel estimation to estimate an effective channel $H_1 P_c$ corresponding to the common stream $X_c$. Here, the UE 115-b may obtain the channel estimate $H_1 P_c$ using the PRB bundling size configured for the common stream $X_c$ (e.g., as indicated by the network entity). For instance, the UE 115-b may perform one or more measurements on the received signal $Y_1$ and may calculate one or more channel information parameters using the PRB bundling size.

At 325-b, the UE 115-b may perform a channel estimation to estimate an effective channel $H_1 P_1$ corresponding to the private stream $X_1$. The UE 115-b may obtain the channel estimate c by using the PRB bundling size configured for the private stream $X_1$.

At 330, the UE 115-b may decode the common message $W_c$ based on the channel estimation performed at 325-a. The UE 115-b may perform interference cancellation using the decoded common message $W_c$ and the channel estimate $H_1 P_c$ in order to decode the private message $W_{1,p}$. For example, at 335, the UE 115-b may re-encode the common message $W_c$ to the common stream $X_c$ and may multiply $X_c$ by the channel estimate $H_1 P_c$ to obtain a reconstruction of a portion of the received signal corresponding to the common stream $X_c$, e.g., to obtain $H_1 P_c X_c$. At 340, the UE 115-b may remove $H_1 P_c X_c$ from the received signal $Y_1$ to obtain a portion of the received signal corresponding to the private stream $X_1$, which may be represented by $Y_{1,p}$ and given by Equation 3.

$$Y_{1,p} = Y_1 - H_1 P_c X_c = H_1 P_1 X_1 + H_1 P_2 X_2 + N_1 \quad (3)$$

At 345, the UE 115-b may decode the private message $W_{1,p}$ using $Y_{1,p}$ and the channel estimate $H_1 P_1$ (e.g., obtained at 325-b). At 350, the UE 115-b may obtain the message $W_1$ by combining the portion of the common message $W_c$ that includes data for the UE 115-b (e.g., the UE 115-b may discard data in the common message $W_c$ that is associated with other UEs 115) with the decoded private message $W_{1,p}$.

Figure 4:
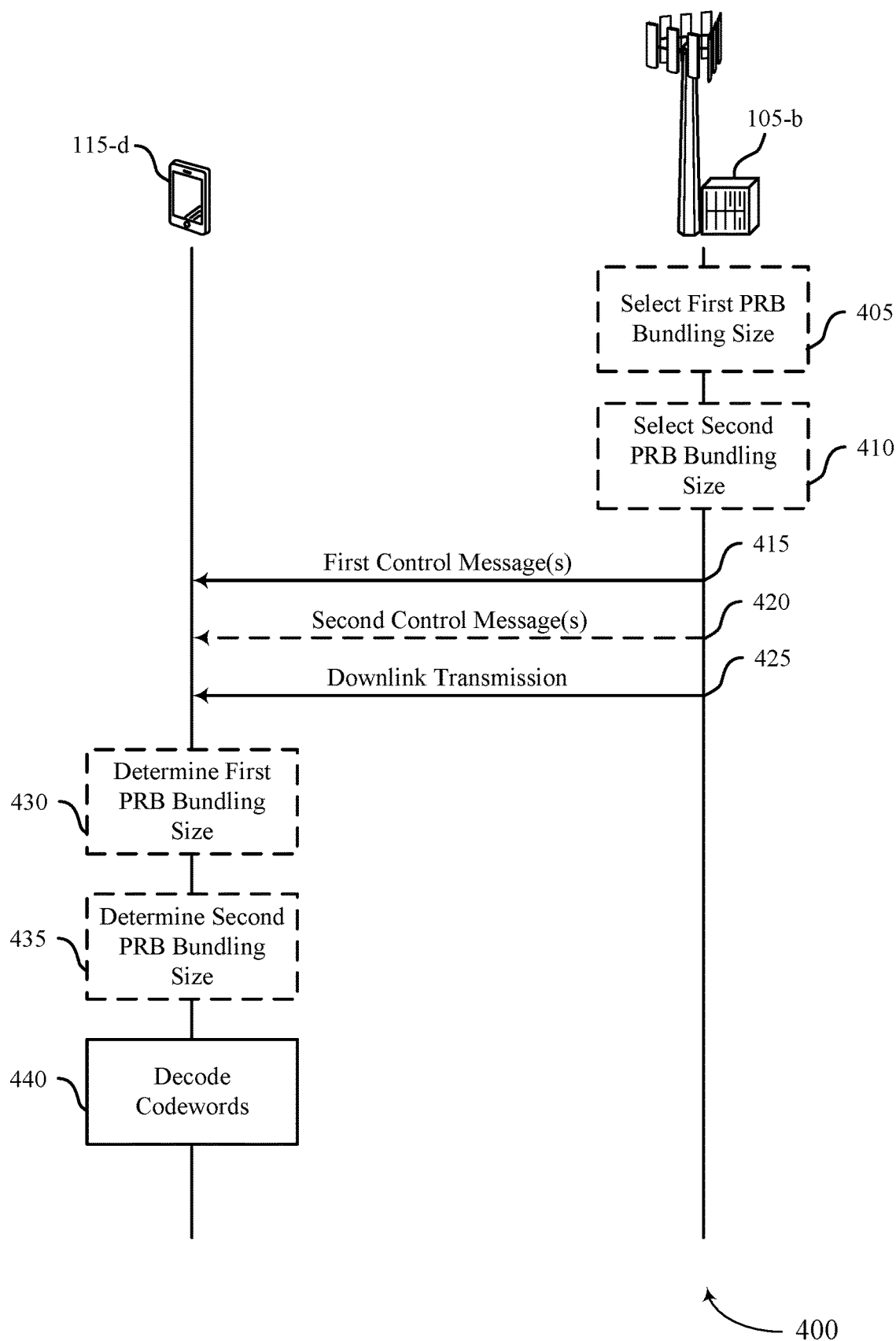
FIG. 4 illustrates an example of a process flow in a system that supports unequal PRG sizes for multiple-codeword downlink data transmissions in accordance with one or more aspects of the present disclosure.

FIG. 4 illustrates an example of a process flow 400 in a system that supports unequal PRG sizes for multiple-codeword downlink data transmissions in accordance with one or more aspects of the present disclosure. In some examples, process flow 400 may implement aspects of wireless communications systems 100 and 200. For example, process flow 400 includes a UE 115-d and a network entity 105-b, which may be examples of the corresponding devices described herein. Additionally, the operations in process flow 400 performed by the UE 115-d and the network entity 105-b may be respectively performed by a UE 115, a network entity 105, or another wireless device, and the example shown should not be construed as limiting.

Process flow 400 may be an example of the network entity 105-b communicating with the UE 115-d via a downlink shared channel, such as a PDSCH, that is associated with multiple layers. For example, in the process flow 400, the network entity 105-b may transmit a downlink transmission to the UE 115-d using four or more layers and at least two codewords, where each codeword is associated with a respective set of layers of the four or more layers. That is, the network entity 105-b may map a first codeword of the downlink transmission to a first set of layers (e.g., including two or more layers of the four or more layers) of the downlink shared channel, and may map a second codeword of the downlink transmission to a second set of layers (e.g., including two or more layers of the four or more layers) of the downlink shared channel. The first set of layers may be different from the second set of layers.

Additionally, in some examples, the first set of layers may be associated with a private data stream of the downlink transmission and the second set of layers may be associated with a common data stream of the downlink transmission. Alternatively, in some other examples, the first set of layers may be associated with a common data stream of the downlink transmission and the second set of layers may be associated with a private data stream of the downlink transmission. A private data stream may be associated with downlink data for the UE 115-*d*, and a common data stream may be associated with downlink data for the UE 115-*d* and with downlink data for one or more other wireless devices, e.g., different from the UE 115-*d*.

At 405, the network entity 105-*b* may select a first PRB bundling size for the first set of layers. The first PRB bundling size may be statically or dynamically configured (e.g., may be configured as a static bundling type or a dynamic bundling type), and in some cases, the network entity 105-*b* may select the first PRB bundling size based on the bundling type associated with the first set of layers. For example, the first PRB bundling size may be statically configured, and the network entity 105-*b* may select the first PRB bundling size from a set of PRB bundling sizes associated with a static bundling type, which may include, but is not limited to, 2, 4, and a wideband PRB bundling size (e.g., n2-wideband, n4-wideband). In some cases, the set of PRB bundling sizes associated with the static bundling type may further include an indication that the first PRB bundling size is the same as the second PRB bundling size.

Alternatively, the first PRB bundling size may be dynamically configured. Here, the first set of layers may be associated with a first set of PRB bundling sizes (which may include, but is not limited to, 2, 4, wideband, etc.) and a second set of PRB bundling sizes (e.g., 2, 4, wideband, etc.) based on the first PRB bundling size being configured as the dynamic bundling type. In some cases, the first set of PRB bundling sizes may contain multiple PRB bundling sizes and the second set of PRB bundling sizes may contain one or more PRB bundling sizes. The network entity 105-*b* may select the first PRB bundling size from the first set of PRB bundling sizes and the second set of PRB bundling sizes. In some cases, the network entity 105-*b* may select the first PRB bundling size based on a size of PRBs allocated to the first codeword, a ratio of a size of the PRBs allocated to the first codeword and size of a bandwidth part associated with the first codeword, an MCS associated with the first set of layers, a quantity of layers of the first set of layers, or a combination thereof. Additionally, or alternatively, the network entity 105-*b* may select the first PRB bundling size from the first set of PRB bundling sizes based on a ratio of a size of the PRBs allocated to the first codeword and size of a bandwidth part associated with the first codeword.

In some cases, the network entity 105-*b* may select the first PRB bundling size based on scheduling information for the downlink transmission. In such cases, the first set of layers may be associated with a common data stream of the downlink transmission and the second set of layers may correspond to a private data stream of the downlink transmission. For example, the network entity 105-*b* may schedule the downlink transmission across one or more sets of PRBs in the frequency domain. If a set of PRBs (e.g., a set of two or more PRBs) associated with the downlink transmission are contiguous in the frequency domain, the network entity 105-*b* may select the first PRB bundling size to be a wideband PRB bundling size. Alternatively, the network entity 105-*b* may select the first PRB bundling size based on two or more PRBs associated with the downlink transmission being non-contiguous in the frequency domain. For example, based on the two or more PRBs being non-contiguous, the network entity 105-*b* may select the first PRB bundling size to be the same as the second PRB bundling size, or to be a predetermined value (e.g., 2 or 4). In some cases, the two or more PRBs may include at least one portion that is contiguous in the frequency domain, and the network entity 105-*b* may select the first PRB bundling size to be equal to a size of the contiguous portion.

At 410, the network entity 105-*b* may select a second PRB bundling size for the second set of layers. The second PRB bundling size may be statically or dynamically configured (e.g., may be configured as a static bundling type or a dynamic bundling type), and in some cases, the network entity 105-*b* may select the second PRB bundling size depending on the bundling type associated with the second set of layers. For example, the second PRB bundling size may be statically configured, and the network entity 105-*b* may select the second PRB bundling size from a set of PRB bundling sizes associated with a static bundling type, which may include, but is not limited to, 2, 4, and a wideband PRB bundling size (e.g., n2-wideband, n4-wideband).

Alternatively, the second PRB bundling size may be dynamically configured. The second set of layers may be associated with a third set of PRB bundling sizes (e.g., including multiple PRB bundling sizes, such as 2, 4, wideband, etc.) and a fourth set of PRB bundling sizes (e.g., including one or more PRB bundling sizes, such as 2, 4, wideband, etc.). In some cases, the third set of PRB bundling sizes may be different from the first set of PRB bundling sizes (e.g., associated with the first set of layers) and the fourth set of PRB bundling sizes may be different from the second set of PRB bundling sizes (e.g., associated with the first set of layers). In other cases, the third set of PRB bundling sizes may be the same as the first set of PRB bundling sizes and the fourth set of PRB bundling sizes may be the same as the second set of PRB bundling sizes.

The network entity 105-*b* may select the second PRB bundling size from the first set of PRB bundling sizes and the second set of PRB bundling sizes. In some cases, the network entity 105-*b* may select the second PRB bundling size based on a size of PRBs allocated to the second codeword, a ratio of a size of the PRBs allocated to the second codeword and size of a bandwidth part associated with the second codeword, an MCS associated with the second set of layers, a quantity of layers of the second set of layers, or a combination thereof.

In some examples, the network entity 105-*b* may select the first PRB bundling size based on the second PRB bundling size, or may select the second PRB bundling size based on the first PRB bundling size. In a first example, the network entity 105-*b* may select the first PRB bundling size from a set of two or more PRB bundling sizes that includes an indication that the first PRB bundling size is the same as the second PRB bundling size. Here, the network entity 105-*b* may select that the first PRB bundling size is the same as the second PRB bundling size, e.g., based on the second PRB bundling size being configured as the dynamic bundling type. In a second example, the network entity 105-*b* may select the first PRB bundling size such that the first PRB bundling size is at least one PRB bundling size increment greater than the second PRB bundling size, or may select the first PRB bundling size to be a wideband PRB bundling size based on the second PRB bundling size being the wideband PRB bundling size. In such examples, the first set of layers may correspond to a common data stream of the downlink transmission and the second set of layers may correspond to a private data stream of the downlink transmission.

In another example, the network entity 105-*b* may select the second PRB bundling size based on the first PRB bundling size. For instance, the network entity 105-*b* may select the second PRB bundling size to be the same as the first PRB bundling size or to be different from the first PRB bundling size. Alternatively, the network entity 105-*b* may select the second PRB bundling size to be smaller than the first PRB bundling size, e.g., if the first set of layers is associated with a common data stream of the downlink transmission and the second set of layers is associated with a private data stream of the downlink transmission.

At 415 and, optionally, at 420, the network entity 105-*b* may transmit, and the UE 115-*d* may receive, control signaling (e.g., RRC signaling, DCI, MAC-CE, or the like) including one or more control messages. The one or more control messages may indicate the first PRB bundling size for the first set of layers (e.g., selected at 405), the second PRB bundling size for the second set of layers (e.g., selected at 410), or a combination thereof. In some cases, the one or more control messages transmitted at 415 may additionally indicate a bundling type associated with the first set of layers, the second set of layers, or both. In some examples, the one or more control messages transmitted at 415 may be based on the bundling type associated with the first set of layers, the second set of layers, or both. For instance, the one or more control messages may include or be an example of an RRC message indicating a statically configured PRB bundling size for the first and/or the second sets of layers, a DCI message scheduling the downlink transmission and indicating a dynamically configured PRB bundling size for the first and/or the second sets of layers, etc.

For example, the first and second sets of layers may both be statically configured, e.g., the first PRB bundling size and the second PRB bundling size may both be configured as a static bundling type. At 415, the network entity 105-*b* may transmit, and the UE 115-*d* may receive, a first control message indicating the first PRB bundling size and the second PRB bundling size. The first control message may be an example of an RRC message. In some cases, the first control message may additionally include an indication (e.g., a common indication) that the first PRB bundling size and the second PRB bundling size are both configured as the static bundling type.

In other examples, the first set of layers may be statically configured (e.g., the first PRB bundling size may be configured as the static bundling type) and the second set of layers may be dynamically configured (e.g., the second PRB bundling size may be configured as the dynamic bundling type). In such examples, at 415, the network entity 105-*b* may transmit, and the UE 115-*d* may receive, a first control message indicating the first PRB bundling size. The first control message may further indicate that the second PRB bundling size is configured as a dynamic bundling type and may indicate a first set of PRB bundling sizes and a second set of PRB bundling sizes. The first control message may be an example of an RRC message.

In still other examples, the first set of layers and the second set of layers may both be dynamically configured (e.g., the first PRB bundling size and the second PRB bundling size may be configured as the dynamic bundling type). At 415, the network entity 105-*b* may transmit, and the UE 115-*d* may receive, a first control message (e.g., an RRC message) that includes an indication (e.g., a common indication) that the first PRB bundling size and the second PRB bundling size are both configured as the dynamic bundling type. Additionally, the first control message may indicate a first set of PRB bundling sizes and a second set of PRB bundling sizes. In some examples, the first set of PRB bundling sizes and the second set of PRB bundling sizes may be for the first set of layers, and the first control message may further indicate a third set of PRB bundling sizes and a fourth set of PRB bundling sizes for the second set of layers.

At 420, the network entity 105-*b* may transmit, and the UE 115-*d* may receive, a second control message of the one or more control messages. The second control message may schedule the downlink transmission. Additionally, the second control message may indicate one or more PRB bundling sizes, e.g., for the first set of layers, the second set of layers, or both. In some cases, if one or both of the PRB bundling size and the second PRB bundling size is configured as a dynamic bundling type, the second control message may include an indication of one or more corresponding PRB bundling sizes.

For example, the first set of layers may be statically configured (e.g., the first PRB bundling size may be configured as the static bundling type) and the second set of layers may be dynamically configured (e.g., the second PRB bundling size may be configured as the dynamic bundling type). In such examples, the second control message may indicate the second PRB bundling size. Additionally, or alternatively, if the first control message at 415 indicated a first set of PRB bundling sizes and a second set of PRB bundling sizes, the second control message at 420 may include an indication of one of the first set of PRB bundling sizes or the second PRB bundling sizes, such that the second PRB bundling size may be from the first set of PRB bundling sizes or the second set of PRB bundling sizes based on the indication.

In other examples, the first set of layers and the second set of layers may both be dynamically configured (e.g., the first PRB bundling size and the second PRB bundling size may be configured as the dynamic bundling type). The first control message at 415 may have indicated the first set of PRB bundling sizes and the second set of PRB bundling sizes, and the second control message at 420 may include a first indication of the first set or the second set of PRB bundling sizes. For example, the first PRB bundling size may be from the first set or the second set of PRB bundling sizes based on the indication in the second control message. Additionally, in some examples, the second control message may further include a second indication of whether the second PRB bundling size is the same as the first PRB bundling size. For instance, the second indication may indicate that the second PRB bundling size is the same as or different from the first PRB bundling size.

In some cases, the first control message at 415 may have indicated the first set of PRB bundling sizes, the second set of PRB bundling sizes, the third set of PRB bundling sizes, and the fourth set of PRB bundling sizes. At 420, the second control message may include a first indication of one of the first set of PRB bundling sizes or the second set of PRB bundling sizes such that the first PRB bundling size is from the indicated first or second set of PRB bundling sizes. The second control message may further include a second indication of one of the third set of PRB bundling sizes or the fourth set of PRB bundling sizes such that the second PRB bundling size is from the indicated third or fourth PRB bundling size.

In some cases, e.g., if the first PRB bundling size and the second PRB bundling size are both configured as the dynamic bundling type, the second control message may include a value that indicates two or more pairs of PRB bundling sizes corresponding to the first PRB bundling size and the second PRB bundling size. In some examples, this value may indicate that the second PRB bundling size is smaller than the first PRB bundling size, for instance, if the first set of layers corresponds to a common data stream of the downlink transmission and the second set of layers corresponds to a private data stream of the downlink transmission. Additionally, or alternatively, the value may be mapped to the two or more pairs of PRB bundling sizes. The mapping may be RRC configured or may be preconfigured.

At 425, the network entity 105-*b* may transmit (e.g., via the downlink shared channel), and the UE 115-*d* may receive, the downlink transmission including at least the first codeword and the second codeword, e.g., in accordance with the first PRB bundling size and the second PRB bundling size. If the one or more control messages (e.g., transmitted at 415 and 420) included scheduling information for the downlink transmission, the network entity 105-*b* may transmit (and the UE 115-*d* may receive) the downlink transmission according to the indicated scheduling information.

In some examples, the network entity 105-*b* may transmit (and the UE 115-*d* may receive) the downlink transmission using rate-splitting (e.g., as described with reference to FIGS. 3A and 3B), such that the first set of layers may be associated with a private data stream of the downlink transmission including downlink data for the UE 115-*d*. The second set of layers may be associated with a common data stream of the downlink transmission including downlink data for the UE 115-*d* and downlink data for one or more other devices. Alternatively, the first set of layers may be associated with the common data stream and the second set of layers may be associated with the private data stream.

At 430, the UE 115-*d* may optionally determine or otherwise identify the first PRB bundling size, e.g., based on the first control message at 415, the second control message at 420, or a combination thereof. For example, (e.g., when the first PRB bundling size is configured as a static bundling type), the UE 115-*d* may determine the first PRB bundling size based on an indication of the first PRB bundling size included in the first control message at 415.

Alternatively, the first PRB bundling size may be dynamically configured. The UE 115-*d* may select the first PRB bundling size from the first set of PRB bundling sizes and the second set of PRB bundling sizes, e.g., based on the indication(s) included in the first control message and the second control message. For example, the second control message may indicate a set of multiple PRB bundling sizes—such as the first set of PRB bundling sizes—for the first PRB bundling size, and the UE 115-*d* may select the first PRB bundling size from the indicated set of PRB bundling sizes. For example, the UE 115-*d* may determine the first PRB bundling size based on a size of PRBs allocated to the first codeword, a ratio of a size of the PRBs allocated to the first codeword and size of a bandwidth part associated with the first codeword, an MCS associated with the first set of layers, a quantity of layers of the first set of layers, or a combination thereof. Additionally, or alternatively, the UE 115-*d* may select the first PRB bundling size from the first set of PRB bundling sizes based on a ratio of a size of the PRBs allocated to the first codeword and size of a bandwidth part associated with the first codeword.

In some examples, the UE 115-*d* may determine the first PRB bundling size based on the second control message including a value that indicates two or more pairs of PRB bundling sizes corresponding to the first PRB bundling size and the second PRB bundling size. The UE 115-*d* may be configured (e.g., via RRC signaling) or preconfigured with a mapping between the value and the two or more pairs of PRB bundling sizes, and the UE 115-*d* may determine the first PRB bundling size based on the value (e.g., and the mapping).

In some cases, the UE 115-*d* may determine the first PRB bundling size based on scheduling information for the downlink transmission. In such cases, the first set of layers may be associated with a common data stream of the downlink transmission and the second set of layers may correspond to a private data stream of the downlink transmission. For example, the network entity 105-*b* may schedule the downlink transmission across one or more sets of PRBs in the frequency domain. If a set of PRBs (e.g., a set of two or more PRBs) associated with the downlink transmission are contiguous in the frequency domain, the UE 115-*d* may determine that the first PRB bundling size is a wideband PRB bundling size. Alternatively, the UE 115-*d* may select the first PRB bundling size based on two or more PRBs associated with the downlink transmission being non-contiguous in the frequency domain. For example, based on the two or more PRBs being non-contiguous, the UE 115-*d* may determine that the first PRB bundling size is the same as the second PRB bundling size, or to be a predetermined value (e.g., 2 or 4). In some cases, the two or more PRBs may include at least one portion that is contiguous in the frequency domain, and the UE 115-*d* may determine that the first PRB bundling size is equal to a size of the contiguous portion.

At 435, the UE 115-*d* may optionally determine or otherwise identify the second PRB bundling size, e.g., based on the first control message at 415, the second control message at 420, or a combination thereof. For example, (e.g., when the second PRB bundling size is statically configured), the UE 115-*d* may determine the second PRB bundling size based on an indication of the second PRB bundling size included in the first control message at 415. Alternatively, the second PRB bundling size may be dynamically configured. The UE 115-*d* may select the second PRB bundling size from the set(s) of PRB bundling sizes indicated in the second control message. In some cases, the UE 115-*d* may select the second PRB bundling size (e.g., from the indicated set(s) of PRB bundling sizes) based on a size of PRBs allocated to the second codeword, a ratio of a size of the PRBs allocated to the second codeword and size of a bandwidth part associated with the second codeword, an MCS associated with the second set of layers, a quantity of layers of the second set of layers, or a combination thereof.

In some examples, the UE 115-*d* may determine the second PRB bundling size based on the second control message including a value that indicates two or more pairs of PRB bundling sizes corresponding to the first PRB bundling size and the second PRB bundling size. The UE 115-*d* may be configured (e.g., via RRC signaling) or preconfigured with a mapping between the value and the two or more pairs of PRB bundling sizes, and the UE 115-*d* may determine the second PRB bundling size based on the value (e.g., and the mapping).

In some cases, the UE 115-*d* may determine the second PRB bundling size based on the second PRB bundling size, or may determine the second PRB bundling size based on the first PRB bundling size. In a first example, the UE 115-*d* may select the first PRB bundling size from a set of two or more PRB bundling sizes that includes an indication that the first PRB bundling size is the same as the second PRB bundling size. Here, the UE 115-*d* may determine that the first PRB bundling size is the same as the second PRB bundling size, e.g., based on the second PRB bundling size being configured as the dynamic bundling type. In a second example, the UE 115-*d* may determine that the first PRB bundling size is a wideband PRB bundling size based on the second PRB bundling size being the wideband PRB bundling size. In such examples, the first set of layers may correspond to a common data stream of the downlink transmission and the second set of layers may correspond to a private data stream of the downlink transmission.

In another example, the UE 115-*d* may select the second PRB bundling size based on the first PRB bundling size. For instance, the UE 115-*d* may determine that the second PRB bundling size is the same as the first PRB bundling size or is different from the first PRB bundling size. Alternatively, the UE 115-*b* may determine that the second PRB bundling size is smaller than the first PRB bundling size, e.g., if the first set of layers is associated with a common data stream of the downlink transmission and the second set of layers is associated with a private data stream of the downlink transmission.

At 440, the UE 115-*d* may decode the first codeword and the second codeword of the downlink transmission based on the first PRB bundling size and the second PRB bundling size. For example, the UE 115-*d* may perform one or more channel estimations (e.g., may obtain one or more channel estimates) using the first PRB bundling size and the second PRB bundling size, and may decode the codewords based on the channel estimations.

In some examples, e.g., in rate-splitting scenarios, the first set of layers may be associated with a private data stream of the downlink transmission and the second set of layers may be associated with a common data stream of the downlink transmission. In other examples, the first set of layers may be associated with a common data stream of the downlink transmission and the second set of layers may be associated with a private data stream of the downlink transmission. In any case, the UE 115-*d* may obtain a channel estimate for the common stream and a channel estimate for the private stream based on the respective corresponding PRB bundling sizes. The UE 115-*d* may decode the codeword corresponding to the common stream based on the channel estimate for the common stream. The UE 115-*d* may perform interference cancellation to decode the codeword corresponding to the private stream. For example, the UE 115-*d* may use the decoded codeword, the channel estimate for the common stream, and the channel estimate for the private stream to decode the codeword corresponding to the private stream.

Figure 5:
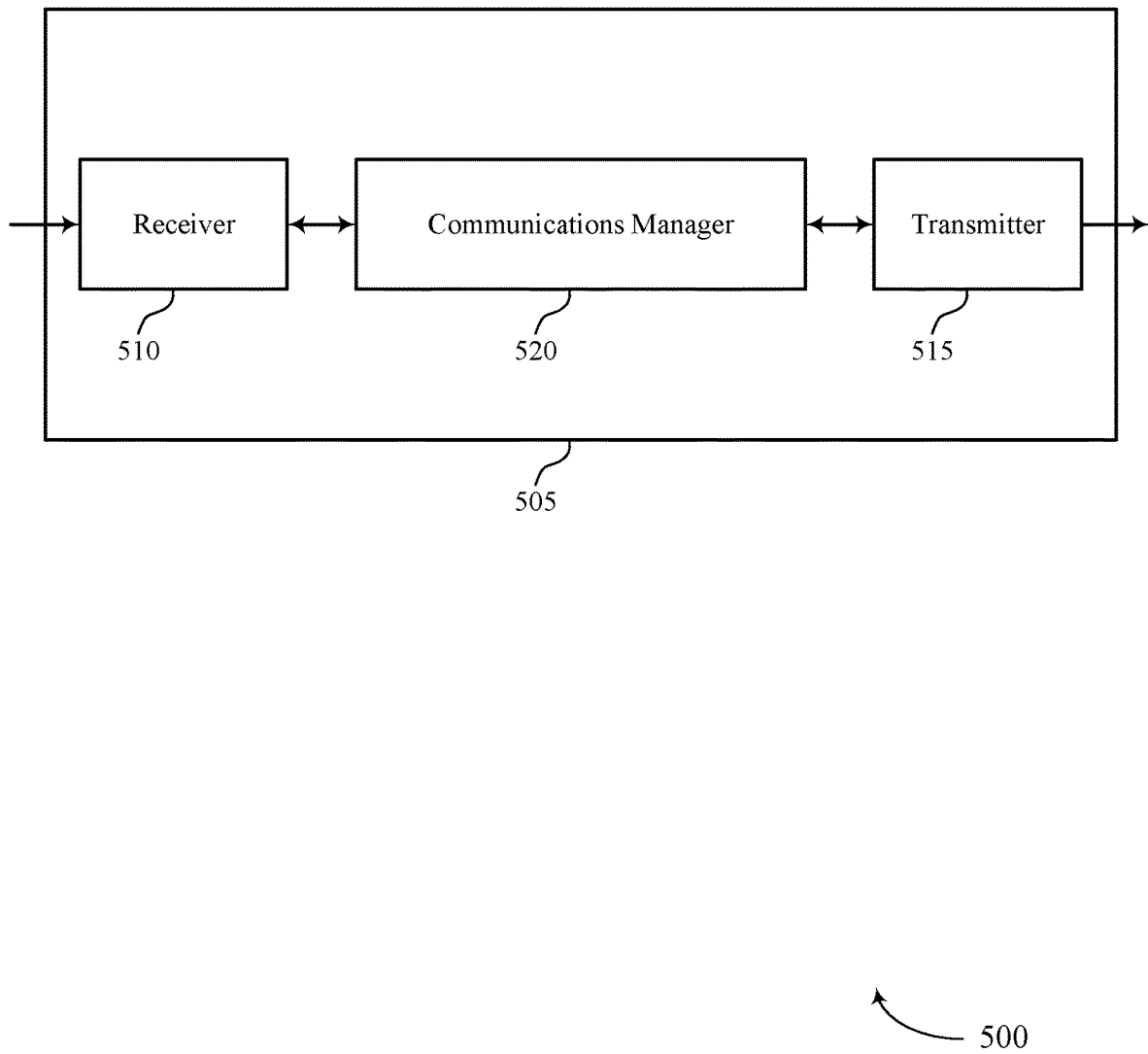
FIGS. 5 and 6 show block diagrams of devices that support unequal PRG sizes for multiple-codeword downlink data transmissions in accordance with one or more aspects of the present disclosure.

FIG. 5 shows a block diagram 500 of a device 505 that supports unequal PRG sizes for multiple-codeword downlink data transmissions in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to unequal PRG sizes for multiple-codeword downlink data transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to unequal PRG sizes for multiple-codeword downlink data transmissions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of unequal PRG sizes for multiple-codeword downlink data transmissions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 may be configured as or otherwise support a means for receiving one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The communications manager 520 may be configured as or otherwise support a means for receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The communications manager 520 may be configured as or otherwise support a means for decoding the first codeword and the second codeword based on one or more channel estimates using the first PRB bundling size and the second PRB bundling size.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for independently configuring PRB bundling sizes for each codeword in multi-layer downlink transmissions. The device 505 may receive each codeword in accordance with a respective PRB bundling size that provides corresponding performance benefits. For example, the device 505 may decode a first codeword using a relatively small PRB bundling size, which may reduce interference (e.g., inter-device interference). The device 505 may additionally decode a second codeword using a relatively large PRB bundling size (e.g., a wideband PRB bundling size), which may provide improved accuracy in channel estimates associated with the second codeword. Accordingly, the techniques described herein may enable the device 505 to communicate with increased efficiency and improved reliability, thereby avoiding retransmissions associated with failed decoding and reducing power consumption.

Figure 6:
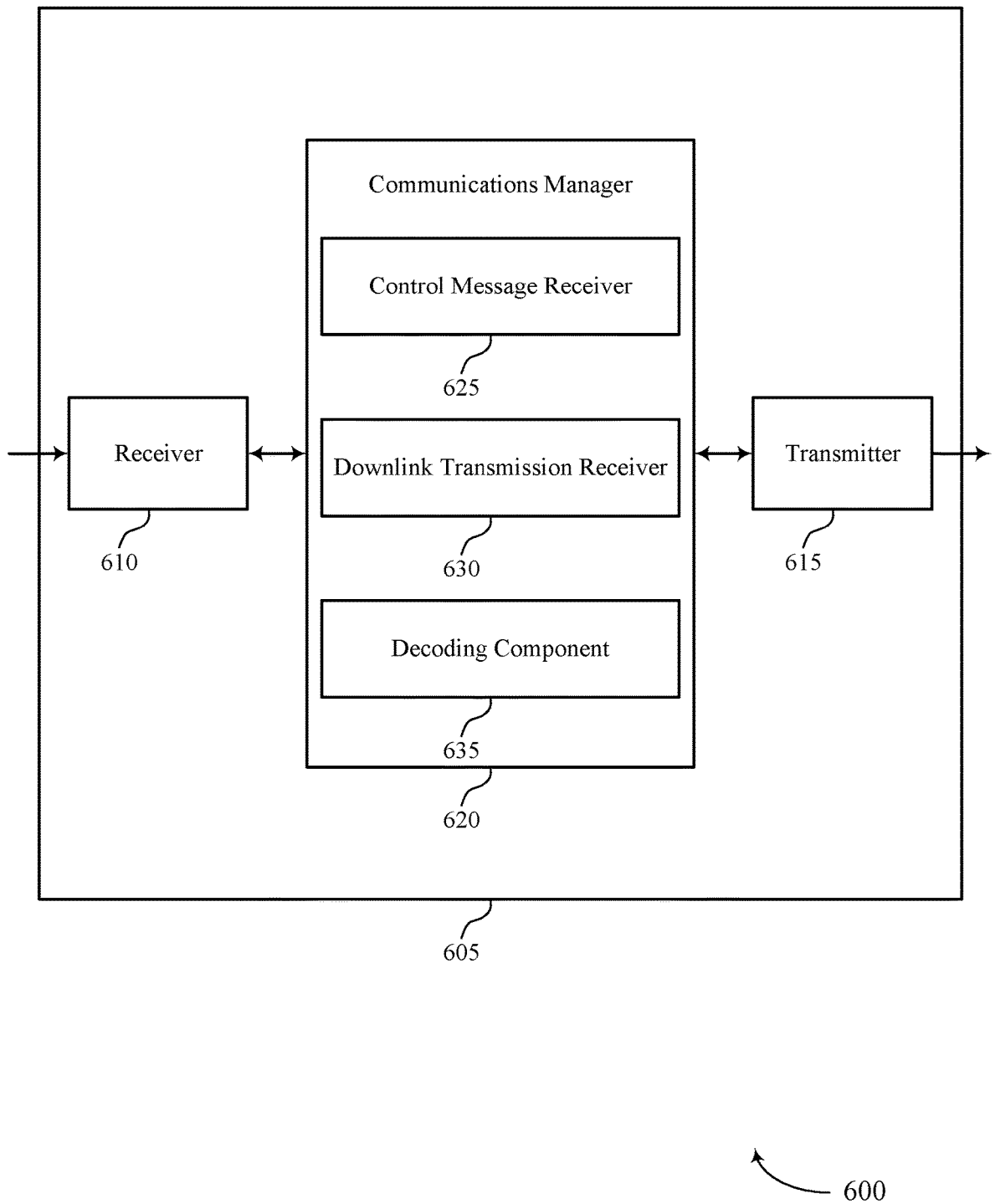

FIG. 6 shows a block diagram 600 of a device 605 that supports unequal PRG sizes for multiple-codeword downlink data transmissions in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to unequal PRG sizes for multiple-codeword downlink data transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to unequal PRG sizes for multiple-codeword downlink data transmissions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of unequal PRG sizes for multiple-codeword downlink data transmissions as described herein. For example, the communications manager 620 may include a control message receiver 625, a downlink transmission receiver 630, a decoding component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The control message receiver 625 may be configured as or otherwise support a means for receiving one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The downlink transmission receiver 630 may be configured as or otherwise support a means for receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The decoding component 635 may be configured as or otherwise support a means for decoding the first codeword and the second codeword based on one or more channel estimates using the first PRB bundling size and the second PRB bundling size.

Figure 7:
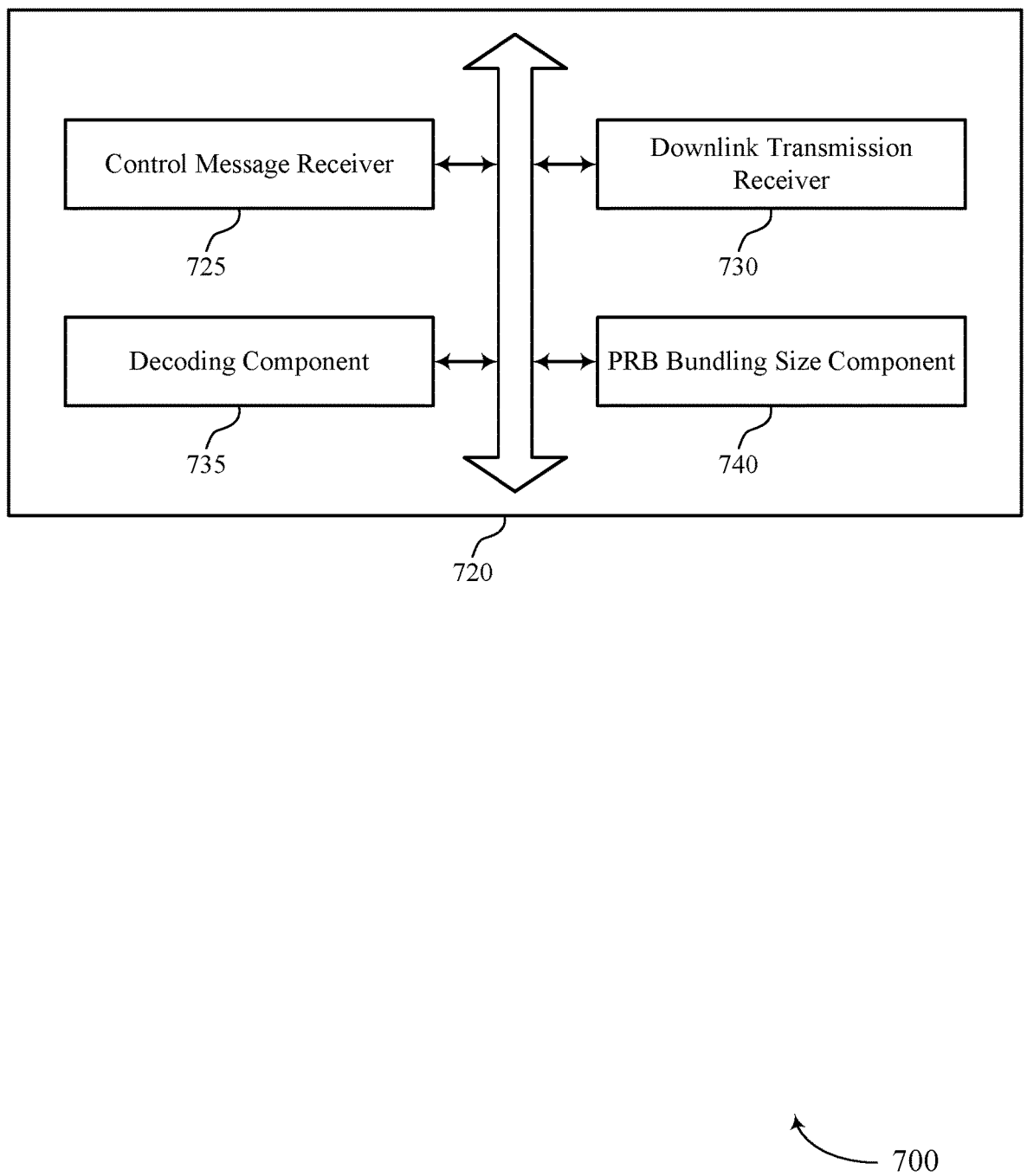
FIG. 7 shows a block diagram of a communications manager that supports unequal PRG sizes for multiple-codeword downlink data transmissions in accordance with one or more aspects of the present disclosure.

FIG. 7 shows a block diagram 700 of a communications manager 720 that supports unequal PRG sizes for multiple-codeword downlink data transmissions in accordance with one or more aspects of the present disclosure. The communications manager 720 may be an example of aspects of a communications manager 520, a communications manager 620, or both, as described herein. The communications manager 720, or various components thereof, may be an example of means for performing various aspects of unequal PRG sizes for multiple-codeword downlink data transmissions as described herein. For example, the communications manager 720 may include a control message receiver 725, a downlink transmission receiver 730, a decoding component 735, a PRB bundling size component 740, or any combination thereof. Each of these components may communicate, directly or indirectly, with one another (e.g., via one or more buses).

The communications manager 720 may support wireless communications in accordance with examples as disclosed herein. The control message receiver 725 may be configured as or otherwise support a means for receiving one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The downlink transmission receiver 730 may be configured as or otherwise support a means for receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The decoding component 735 may be configured as or otherwise support a means for decoding the first codeword and the second codeword based on one or more channel estimates using the first PRB bundling size and the second PRB bundling size.

In some examples, to support receiving the one or more control messages, the control message receiver 725 may be configured as or otherwise support a means for receiving a first control message indicating the first PRB bundling size and the second PRB bundling size, where the first PRB bundling size and the second PRB bundling size are configured as a static bundling type. In some examples, the first control message includes a common indication that the first PRB bundling size and the second PRB bundling size are both configured as the static bundling type.

In some examples, to support receiving the one or more control messages, the control message receiver 725 may be configured as or otherwise support a means for receiving a first control message indicating the first PRB bundling size, the first PRB bundling size being configured as a static bundling type, where the first control message indicates that the second PRB bundling size is configured as a dynamic bundling type and further indicates a first set of PRB bundling sizes and a second set of PRB bundling sizes. In some examples, to support receiving the one or more control messages, the control message receiver 725 may be configured as or otherwise support a means for receiving a second control message scheduling the downlink transmission and including an indication of one of the first set of PRB bundling sizes or the second set of PRB bundling sizes, where the second PRB bundling size is from the first set of PRB bundling sizes or the second set of PRB bundling sizes based on the indication.

In some examples, the second PRB bundling size is from the first set of PRB bundling sizes and the first set of PRB bundling sizes includes multiple PRB bundling sizes, and the PRB bundling size component 740 may be configured as or otherwise support a means for determining the second PRB bundling size based on a size of PRBs allocated to the second codeword, a ratio of a size of the PRBs allocated to the second codeword and size of a bandwidth part associated with the second codeword, an MCS associated with the second set of two or more layers, a quantity of layers of the second set of two or more layers, or a combination thereof. In some examples, the first set of two or more layers is associated with a private data stream of the downlink transmission and the second set of two or more layers is associated with a common data stream of the downlink transmission, the private data stream being associated with downlink data for a first wireless device and the common data stream being associated with downlink data for the first wireless device and with downlink data for a second wireless device different from the first wireless device.

In some examples, the first PRB bundling size is from a set of two or more PRB bundling sizes, and the PRB bundling size component 740 may be configured as or otherwise support a means for determining the second PRB bundling size based on the second control message and the first set of PRB bundling sizes or the second set of PRB bundling sizes. In some examples, the first PRB bundling size is from a set of two or more PRB bundling sizes, and the PRB bundling size component 740 may be configured as or otherwise support a means for determining that the first PRB bundling size is the same PRB bundling size as the second PRB bundling size based on the second PRB bundling size being configured as the dynamic bundling type and the first control message indicating that the first PRB bundling size is the same as the second PRB bundling size. In some examples, the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

In some examples, to support receiving the one or more control messages, the control message receiver 725 may be configured as or otherwise support a means for receiving a first control message indicating that the first PRB bundling size and the second PRB bundling size are configured as a dynamic bundling type, where the first control message indicates a first set of PRB bundling sizes and a second set of PRB bundling sizes for the first set of two or more layers and a third set of PRB bundling sizes and a fourth set of PRB bundling sizes for the second set of two or more layers. In some examples, to support receiving the one or more control messages, the control message receiver 725 may be configured as or otherwise support a means for receiving a second control message scheduling the downlink transmission and including a first indication of one of the first set of PRB bundling sizes or the second set of PRB bundling sizes and a second indication of one of the third set of PRB bundling sizes or the fourth set of PRB bundling sizes, where the first PRB bundling size is from the first set of PRB bundling sizes or the second set of PRB bundling sizes based on the first indication, and the second PRB bundling size is from the third set of PRB bundling sizes or the fourth set of PRB bundling sizes based on the second indication.

In some examples, the PRB bundling size component 740 may be configured as or otherwise support a means for determining the first PRB bundling size based on the second control message indicating the first set of PRB bundling sizes and a ratio of a size of the PRBs allocated to the first codeword and size of a bandwidth part associated with the first codeword. In some examples, the PRB bundling size component 740 may be configured as or otherwise support a means for determining the first PRB bundling size based on the second control message indicating the second set of PRB bundling sizes, where the first PRB bundling size includes a PRB bundling size from the second set of PRB bundling sizes.

In some examples, the first set of PRB bundling sizes is different from the third set of PRB bundling sizes. In some examples, the second set of PRB bundling sizes is different from the fourth set of PRB bundling sizes.

In some examples, the first set of PRB bundling sizes is the same as the third set of PRB bundling sizes. In some examples, the second set of PRB bundling sizes is the same as the fourth set of PRB bundling sizes.

In some examples, the first control message includes a common indication that the first PRB bundling size and the second PRB bundling size are both configured as the dynamic bundling type.

In some examples, to support receiving the one or more control messages, the control message receiver 725 may be configured as or otherwise support a means for receiving a first control message indicating that the first PRB bundling size and the second PRB bundling size are configured as a dynamic bundling type. In some examples, to support receiving the one or more control messages, the control message receiver 725 may be configured as or otherwise support a means for receiving a second control message scheduling the downlink transmission and including a value that indicates two or more pairs of PRB bundling sizes corresponding to the first PRB bundling size and the second PRB bundling size. In some examples, a mapping between the value and the two or more pairs of PRB bundling sizes are configured via radio resource control signaling or are preconfigured.

In some examples, the value indicates that the second PRB bundling size is a smaller PRB bundling size than the first PRB bundling size. In some examples, the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

In some examples, to support receiving the one or more control messages, the control message receiver 725 may be configured as or otherwise support a means for receiving a first control message indicating that the first PRB bundling size and the second PRB bundling size are configured as a dynamic bundling type and further indicates a first set of PRB bundling sizes and a second set of PRB bundling sizes. In some examples, to support receiving the one or more control messages, the control message receiver 725 may be configured as or otherwise support a means for receiving a second control message scheduling the downlink transmission and including a first indication of the first set of PRB bundling sizes or the second set of PRB bundling sizes, where the first PRB bundling size is from the first set of PRB bundling sizes or the second set of PRB bundling sizes based on the indication, the second control message further including a second indication of whether the second PRB bundling size is a same PRB bundling size as the first PRB bundling size.

In some examples, the second indication includes an indication that the second PRB bundling size is the same PRB bundling size as the first PRB bundling size. In some examples, the second PRB bundling size is determined based on the first PRB bundling size and the second indication.

In some examples, the second indication includes an indication that the second PRB bundling size is different from the first PRB bundling size. In some examples, the second PRB bundling size is determined based on the first PRB bundling size and the second indication.

In some examples, the first PRB bundling size is at least one PRB bundling size increment greater than the second PRB bundling size based on the second indication, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

In some examples, the second PRB bundling size includes a wideband PRB bundling size. In some examples, the first PRB bundling size includes the wideband PRB bundling size based on the second PRB bundling size including the wideband PRB bundling size, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

In some examples, the PRB bundling size component 740 may be configured as or otherwise support a means for determining the second PRB bundling size based on the one or more control messages, where the first PRB bundling size includes a wideband PRB bundling size based on two or more PRB s associated with the downlink transmission being contiguous in a frequency domain, and where the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

In some examples, the PRB bundling size component 740 may be configured as or otherwise support a means for determining the second PRB bundling size based on the one or more control messages. In some examples, the PRB bundling size component 740 may be configured as or otherwise support a means for determining the first PRB bundling size based on two or more PRBs associated with the downlink transmission being non-contiguous in a frequency domain, where the first set of two or more layers corresponds to a common data stream of the downlink transmission and the second set of two or more layers corresponds to a private data stream of the downlink transmission, the private data stream being associated with downlink data for a first wireless device and the common data stream being associated with downlink data for the first wireless device and with downlink data for a second wireless device different from the first wireless device.

In some examples, the first PRB bundling size and the PRB bundling size are a same PRB bundling size based on the two or more PRBs being non-contiguous.

In some examples, the first PRB bundling size includes a predetermined value.

In some examples, the two or more PRBs of the downlink transmission include at least one portion that is contiguous in the frequency domain. In some examples, the first PRB bundling size is equal to a size of the contiguous portion of the two or more PRBs.

Figure 8:
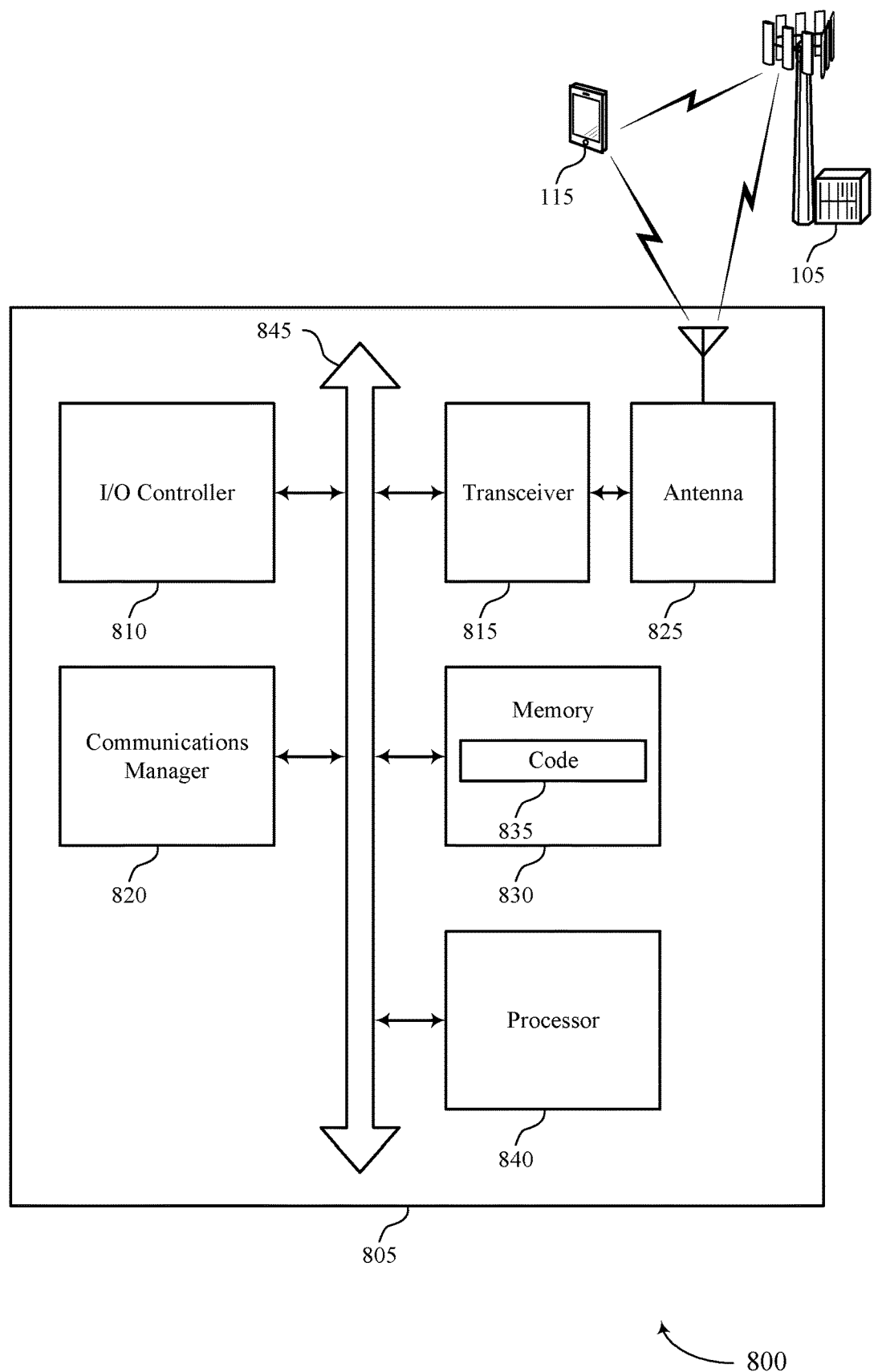
FIG. 8 shows a diagram of a system including a device that supports unequal PRG sizes for multiple-codeword downlink data transmissions in accordance with one or more aspects of the present disclosure.

FIG. 8 shows a diagram of a system 800 including a device 805 that supports unequal PRG sizes for multiple-codeword downlink data transmissions in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840.

These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting unequal PRG sizes for multiple-codeword downlink data transmissions). For example, the device 805 or a component of the device 805 may include a processor 840 and memory 830 coupled with or to the processor 840, the processor 840 and memory 830 configured to perform various functions described herein.

The communications manager 820 may support wireless communications in accordance with examples as disclosed herein. For example, the communications manager 820 may be configured as or otherwise support a means for receiving one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The communications manager 820 may be configured as or otherwise support a means for receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The communications manager 820 may be configured as or otherwise support a means for decoding the first codeword and the second codeword based on one or more channel estimates using the first PRB bundling size and the second PRB bundling size.

By including or configuring the communications manager 820 in accordance with examples as described herein, the device 805 may support techniques for independently configuring PRB bundling sizes for each codeword in multi-layer downlink transmissions. The device 805 may receive each codeword in accordance with a respective PRB bundling size that provides corresponding performance benefits. For example, the device 805 may decode a first codeword using a relatively small PRB bundling size, which may reduce interference (e.g., inter-device interference). The device 805 may additionally decode a second codeword using a relatively large PRB bundling size (e.g., a wideband PRB bundling size), which may provide improved accuracy in channel estimates associated with the second codeword. Accordingly, the techniques described herein may enable the device 805 to decode received communications with increased efficiency and improved reliability. Additionally, the described techniques may increase the likelihood that the device 805 successfully decodes a received transmission, which may enable the device 805 to avoid retransmissions associated with failed decoding, further improving system efficiency and reducing latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of unequal PRG sizes for multiple-codeword downlink data transmissions as described herein, or the processor 840 and the memory 830 may be otherwise configured to perform or support such operations.

Figure 9:
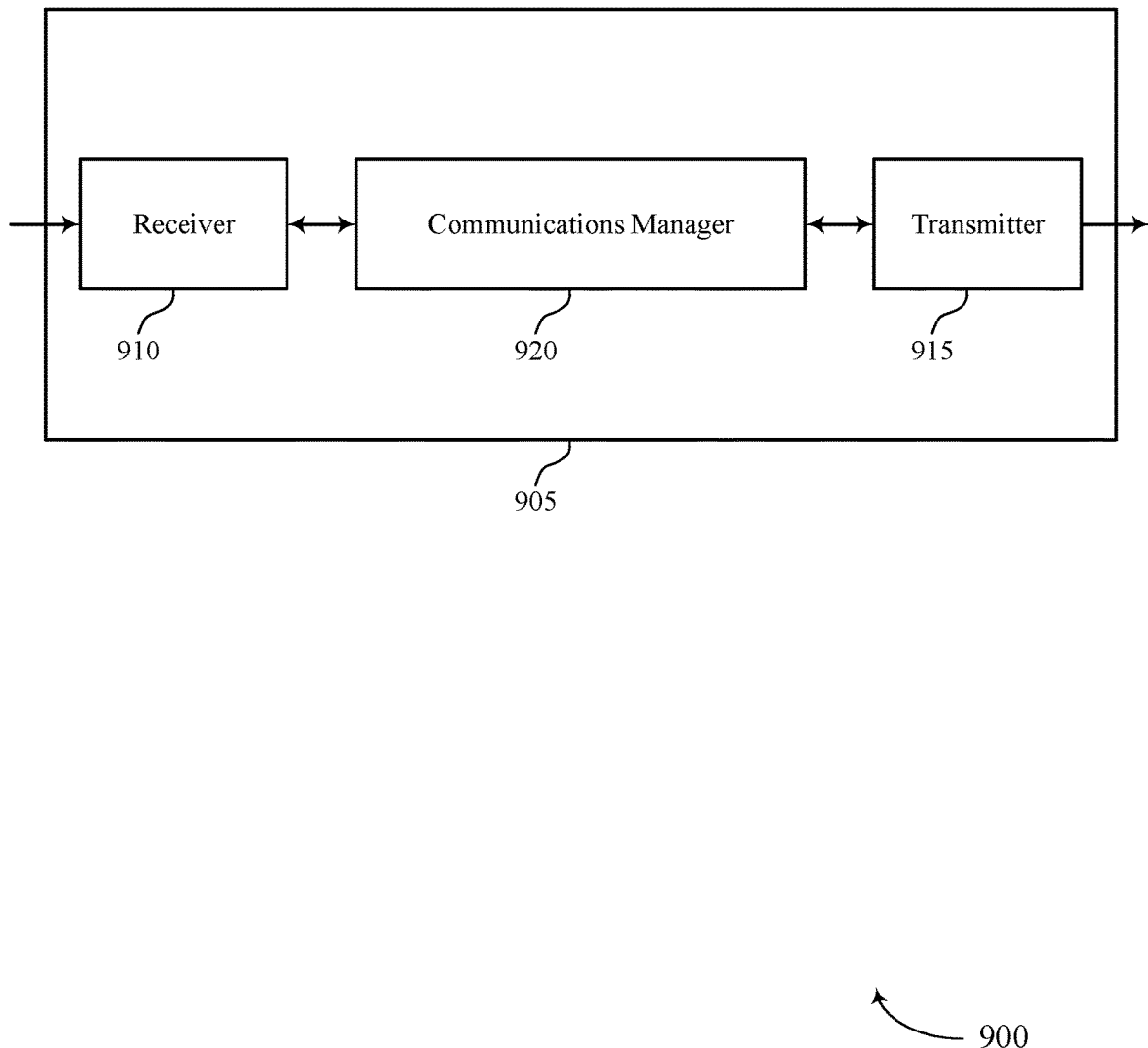
FIGS. 9 and 10 show block diagrams of devices that support unequal PRG sizes for multiple-codeword downlink data transmissions in accordance with one or more aspects of the present disclosure.

FIG. 9 shows a block diagram 900 of a device 905 that supports unequal PRG sizes for multiple-codeword downlink data transmissions in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of unequal PRG sizes for multiple-codeword downlink data transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The communications manager 920 may be configured as or otherwise support a means for transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for independently configuring PRB bundling sizes for each codeword in multi-layer downlink transmissions. The device 905 may configure each codeword and corresponding set of layers with a respective PRB bundling size that provides performance benefits. For example, the device 905 may configure a first codeword with a relatively small PRB bundling size, which may reduce interference (e.g., inter-device interference) at a receiving device. The device 905 may additionally configure a second codeword with a relatively large PRB bundling size (e.g., a wideband PRB bundling size), which may provide improved accuracy in channel estimates associated with the second codeword. Accordingly, the techniques described herein may enable the device 905 to communicate with increased efficiency and improved reliability, thereby avoiding retransmissions associated with failed decoding and reducing power consumption.

Figure 10:
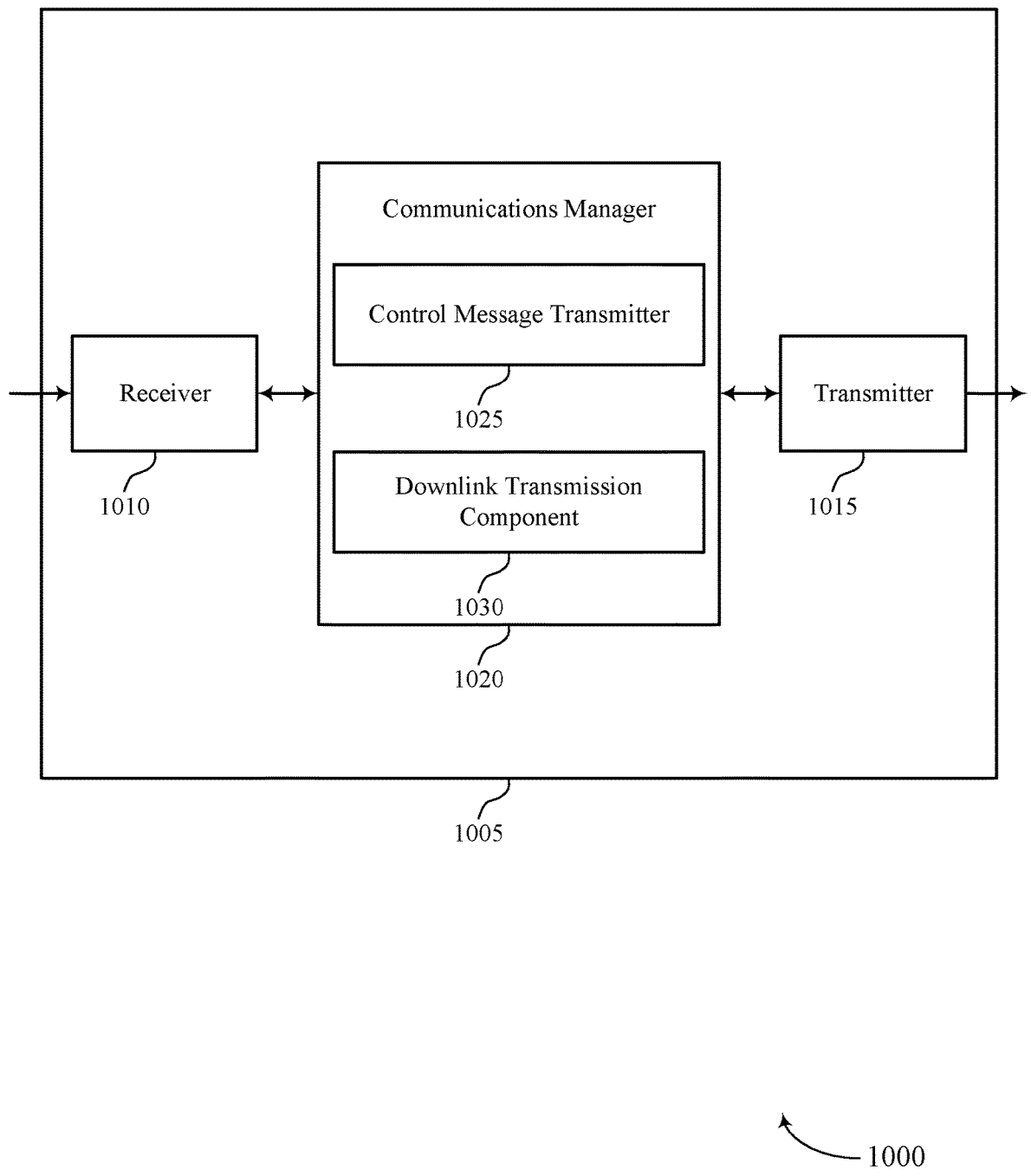

FIG. 10 shows a block diagram 1000 of a device 1005 that supports unequal PRG sizes for multiple-codeword downlink data transmissions in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of unequal PRG sizes for multiple-codeword downlink data transmissions as described herein. For example, the communications manager 1020 may include a control message transmitter 1025 a downlink transmission component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The control message transmitter 1025 may be configured as or otherwise support a means for transmitting one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The downlink transmission component 1030 may be configured as or otherwise support a means for transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

Figure 11:
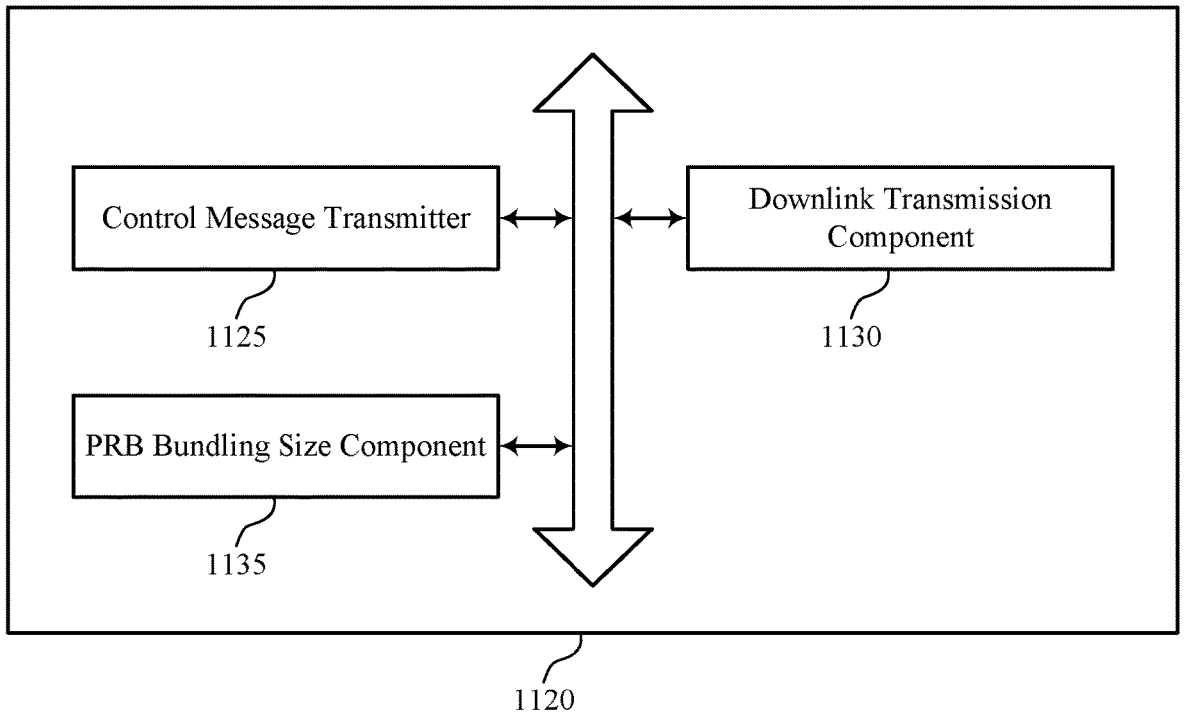
FIG. 11 shows a block diagram of a communications manager that supports unequal PRG sizes for multiple-codeword downlink data transmissions in accordance with one or more aspects of the present disclosure.

FIG. 11 shows a block diagram 1100 of a communications manager 1120 that supports unequal PRG sizes for multiple-codeword downlink data transmissions in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of unequal PRG sizes for multiple-codeword downlink data transmissions as described herein. For example, the communications manager 1120 may include a control message transmitter 1125, a downlink transmission component 1130, a PRB bundling size component 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The control message transmitter 1125 may be configured as or otherwise support a means for transmitting one or more control messages indicating a first PRB (PRB) bundling size for a first set of two or more layers of a downlink shared channel and a second PRB bundling size for a second set of two or more layers of the downlink shared channel, the first set of two or more layers being different from the second set of two or more layers. The downlink transmission component 1130 may be configured as or otherwise support a means for transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

In some examples, to support transmitting the one or more control messages, the control message transmitter 1125 may be configured as or otherwise support a means for transmitting a first control message indicating the first PRB bundling size and the second PRB bundling size, where the first PRB bundling size and the second PRB bundling size are configured as a static bundling type.

In some examples, the first control message includes a common indication that the first PRB bundling size and the second PRB bundling size are both configured as the static bundling type.

In some examples, to support transmitting the one or more control messages, the control message transmitter 1125 may be configured as or otherwise support a means for transmitting a first control message indicating the first PRB bundling size, the first PRB bundling size being configured as a static bundling type, where the first control message indicates that the second PRB bundling size is configured as a dynamic bundling type and further indicates a first set of PRB bundling sizes and a second set of PRB bundling sizes. In some examples, to support transmitting the one or more control messages, the control message transmitter 1125 may be configured as or otherwise support a means for transmitting a second control message scheduling the downlink transmission and including an indication of one of the first set of PRB bundling sizes or the second set of PRB bundling sizes, where the second PRB bundling size is from the first set of PRB bundling sizes or the second set of PRB bundling sizes based on the indication.

In some examples, the second PRB bundling size is selected from the first set of PRB bundling sizes and the first set of PRB bundling sizes includes multiple PRB bundling sizes, and the PRB bundling size component 1135 may be configured as or otherwise support a means for selecting the second PRB bundling size based on a size of PRBs allocated to the second codeword, a ratio of a size of the PRBs allocated to the second codeword and size of a bandwidth part associated with the second codeword, a MCS associated with the second set of two or more layers, a quantity of layers of the second set of two or more layers, or a combination thereof.

In some examples, the first set of two or more layers is associated with a private data stream of the downlink transmission and the second set of two or more layers is associated with a common data stream of the downlink transmission, the private data stream being associated with downlink data for a first wireless device and the common data stream being associated with downlink data for the first wireless device and with downlink data for a second wireless device different from the first wireless device.

In some examples, the first PRB bundling size is selected from a set of two or more PRB bundling sizes, and the PRB bundling size component 1135 may be configured as or otherwise support a means for selecting the second PRB bundling size based on the second control message and the first set of PRB bundling sizes or the second set of PRB bundling sizes. In some examples, the first PRB bundling size is selected from a set of two or more PRB bundling sizes, and the PRB bundling size component 1135 may be configured as or otherwise support a means for selecting that the first PRB bundling size is the same PRB bundling size as the second PRB bundling size based on the second PRB bundling size being configured as the dynamic bundling type and the first control message indicating that the first PRB bundling size is the same as the second PRB bundling size.

In some examples, the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

In some examples, to support transmitting the one or more control messages, the control message transmitter 1125 may be configured as or otherwise support a means for transmitting a first control message indicating that the first PRB bundling size and the second PRB bundling size are configured as a dynamic bundling type, where the first control message indicates a first set of PRB bundling sizes and a second set of PRB bundling sizes for the first set of two or more layers and a third set of PRB bundling sizes and a fourth set of PRB bundling sizes for the second set of two or more layers. In some examples, to support transmitting the one or more control messages, the control message transmitter 1125 may be configured as or otherwise support a means for transmitting a second control message scheduling the downlink transmission and including a first indication of one of the first set of PRB bundling sizes or the second set of PRB bundling sizes and a second indication of one of the third set of PRB bundling sizes or the fourth set of PRB bundling sizes, where the first PRB bundling size is from the first set of PRB bundling sizes or the second set of PRB bundling sizes based on the first indication, and the second PRB bundling size is from the third set of PRB bundling sizes or the fourth set of PRB bundling sizes based on the second indication.

In some examples, the PRB bundling size component 1135 may be configured as or otherwise support a means for selecting the first PRB bundling size based on the second control message indicating the first set of PRB bundling sizes and a ratio of a size of the PRBs allocated to the first codeword and size of a bandwidth part associated with the first codeword.

In some examples, the PRB bundling size component 1135 may be configured as or otherwise support a means for selecting the first PRB bundling size based on the second control message indicating the second set of PRB bundling sizes, where the first PRB bundling size includes a PRB bundling size from the second set of PRB bundling sizes.

In some examples, the first set of PRB bundling sizes is different from the third set of PRB bundling sizes. In some examples, the second set of PRB bundling sizes is different from the fourth set of PRB bundling sizes.

In some examples, the first set of PRB bundling sizes is the same as the third set of PRB bundling sizes. In some examples, the second set of PRB bundling sizes is the same as the fourth set of PRB bundling sizes.

In some examples, the first control message includes a common indication that the first PRB bundling size and the second PRB bundling size are both configured as the dynamic bundling type.

In some examples, to support transmitting the one or more control messages, the control message transmitter 1125 may be configured as or otherwise support a means for transmitting a first control message indicating that the first PRB bundling size and the second PRB bundling size are configured as a dynamic bundling type. In some examples, to support transmitting the one or more control messages, the control message transmitter 1125 may be configured as or otherwise support a means for transmitting a second control message scheduling the downlink transmission and including a value that indicates two or more pairs of PRB bundling sizes corresponding to the first PRB bundling size and the second PRB bundling size. In some examples, a mapping between the value and the two or more pairs of PRB bundling sizes are configured via radio resource control signaling or are preconfigured.

In some examples, the value indicates that the second PRB bundling size is a smaller PRB bundling size than the first PRB bundling size. In some examples, the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

In some examples, to support transmitting the one or more control messages, the control message transmitter 1125 may be configured as or otherwise support a means for transmitting a first control message indicating that the first PRB bundling size and the second PRB bundling size are configured as a dynamic bundling type and further indicates a first set of PRB bundling sizes and a second set of PRB bundling sizes. In some examples, to support transmitting the one or more control messages, the control message transmitter 1125 may be configured as or otherwise support a means for transmitting a second control message scheduling the downlink transmission and including a first indication of the first set of PRB bundling sizes or the second set of PRB bundling sizes, where the first PRB bundling size is from the first set of PRB bundling sizes or the second set of PRB bundling sizes based on the indication, the second control message further including a second indication of whether the second PRB bundling size is a same PRB bundling size as the first PRB bundling size.

In some examples, the second indication includes an indication that the second PRB bundling size is the same PRB bundling size as the first PRB bundling size. In some examples, the second PRB bundling size is selected based on the first PRB bundling size and the second indication.

In some examples, the second indication includes an indication that the second PRB bundling size is different from the first PRB bundling size. In some examples, the second PRB bundling size is selected based on the first PRB bundling size and the second indication.

In some examples, the first PRB bundling size is at least one PRB bundling size increment greater than the second PRB bundling size based on the second indication, the first set of two or more layers being associated with a common data stream of the downlink transmission, and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

In some examples, the second PRB bundling size includes a wideband PRB bundling size. In some examples, the first PRB bundling size includes the wideband PRB bundling size based on the second PRB bundling size including the wideband PRB bundling size, the first set of two or more layers being associated with a common data stream of the downlink transmission, and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

In some examples, the PRB bundling size component 1135 may be configured as or otherwise support a means for selecting the second PRB bundling size based on the one or more control messages, where the first PRB bundling size includes a wideband PRB bundling size based on two or more PRBs associated with the downlink transmission being contiguous in a frequency domain, and where the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

In some examples, the PRB bundling size component 1135 may be configured as or otherwise support a means for selecting the second PRB bundling size based on the one or more control messages. In some examples, the PRB bundling size component 1135 may be configured as or otherwise support a means for selecting the first PRB bundling size based on two or more PRBs associated with the downlink transmission being non-contiguous in a frequency domain, where the first set of two or more layers corresponds to a common data stream of the downlink transmission and the second set of two or more layers corresponds to a private data stream of the downlink transmission, the private data stream being associated with downlink data for a first wireless device and the common data stream being associated with downlink data for the first wireless device and with downlink data for a second wireless device different from the first wireless device.

In some examples, the first PRB bundling size and the PRB bundling size are a same PRB bundling size based on the two or more PRBs being non-contiguous.

In some examples, the first PRB bundling size includes a predetermined value.

In some examples, the two or more PRBs of the downlink transmission include at least one portion that is contiguous in the frequency domain. In some examples, the first PRB bundling size is equal to a size of the contiguous portion of the two or more PRB s.

Figure 12:
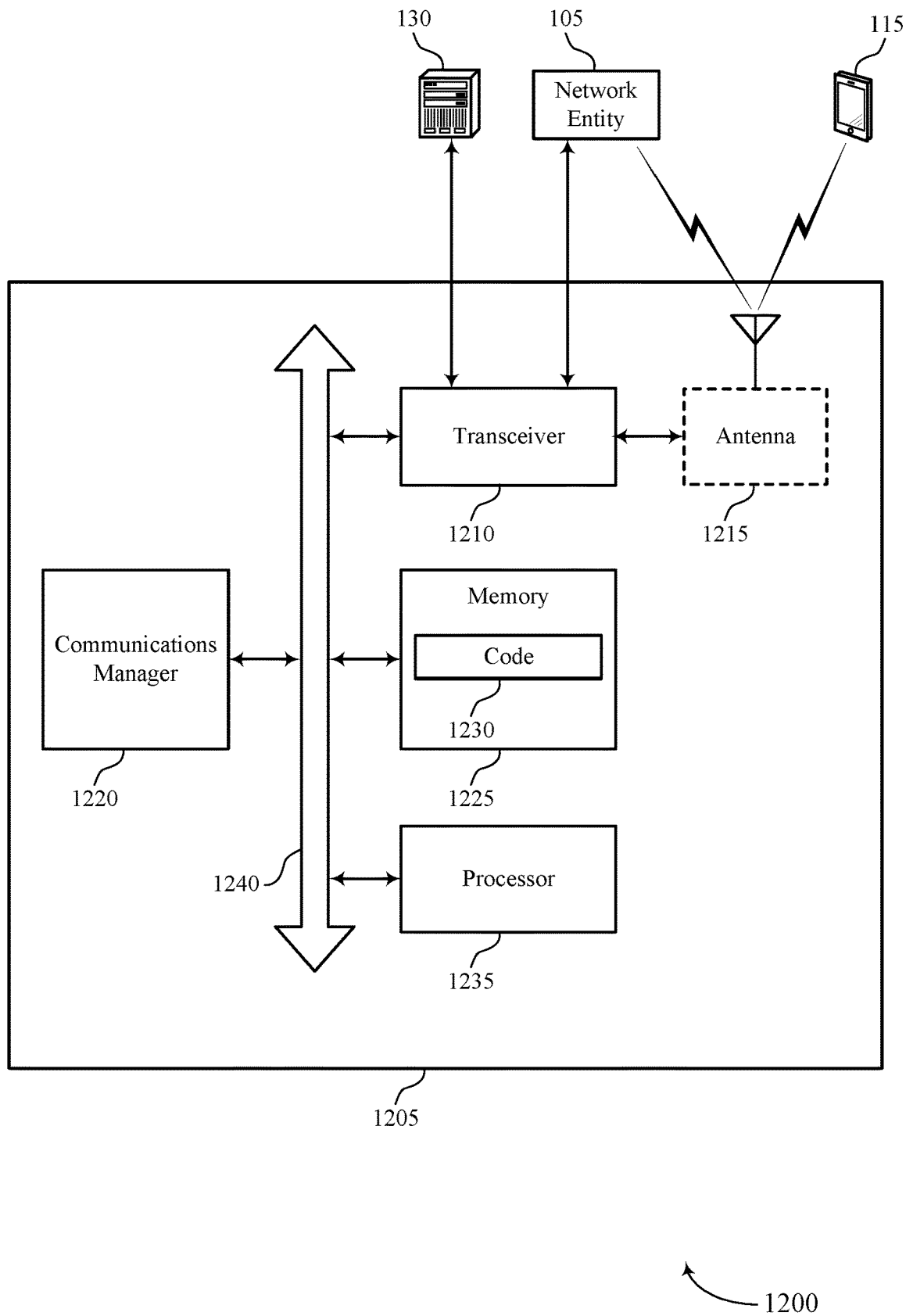
FIG. 12 shows a diagram of a system including a device that supports unequal PRG sizes for multiple-codeword downlink data transmissions in accordance with one or more aspects of the present disclosure.

FIG. 12 shows a diagram of a system 1200 including a device 1205 that supports unequal PRG sizes for multiple-codeword downlink data transmissions in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting unequal PRG sizes for multiple-codeword downlink data transmissions). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an $X_2$ interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting one or more control messages indicating a first PRB (PRB) bundling size for a first set of two or more layers of a downlink shared channel and a second PRB bundling size for a second set of two or more layers of the downlink shared channel, the first set of two or more layers being different from the second set of two or more layers. The communications manager 1220 may be configured as or otherwise support a means for transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers.

By including or configuring the communications manager 1220 in accordance with examples as described herein, the device 1205 may support techniques for independently configuring PRB bundling sizes for each codeword in multi-layer downlink transmissions. The device 1205 may configure each codeword and corresponding set of layers with a respective PRB bundling size that provides performance benefits. For example, the device 1205 may configure a first codeword with a relatively small PRB bundling size, which may reduce interference (e.g., inter-device interference). The device 805 may additionally configure a second codeword with a relatively large PRB bundling size (e.g., a wideband PRB bundling size), which may provide improved accuracy in channel estimates associated with the second codeword. Accordingly, the techniques described herein may enable the device 1205 to communicate with receiving devices with increased efficiency and improved reliability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of unequal PRG sizes for multiple-codeword downlink data transmissions as described herein, or the processor 1235 and the memory 1225 may be otherwise configured to perform or support such operations.

Figure 13:
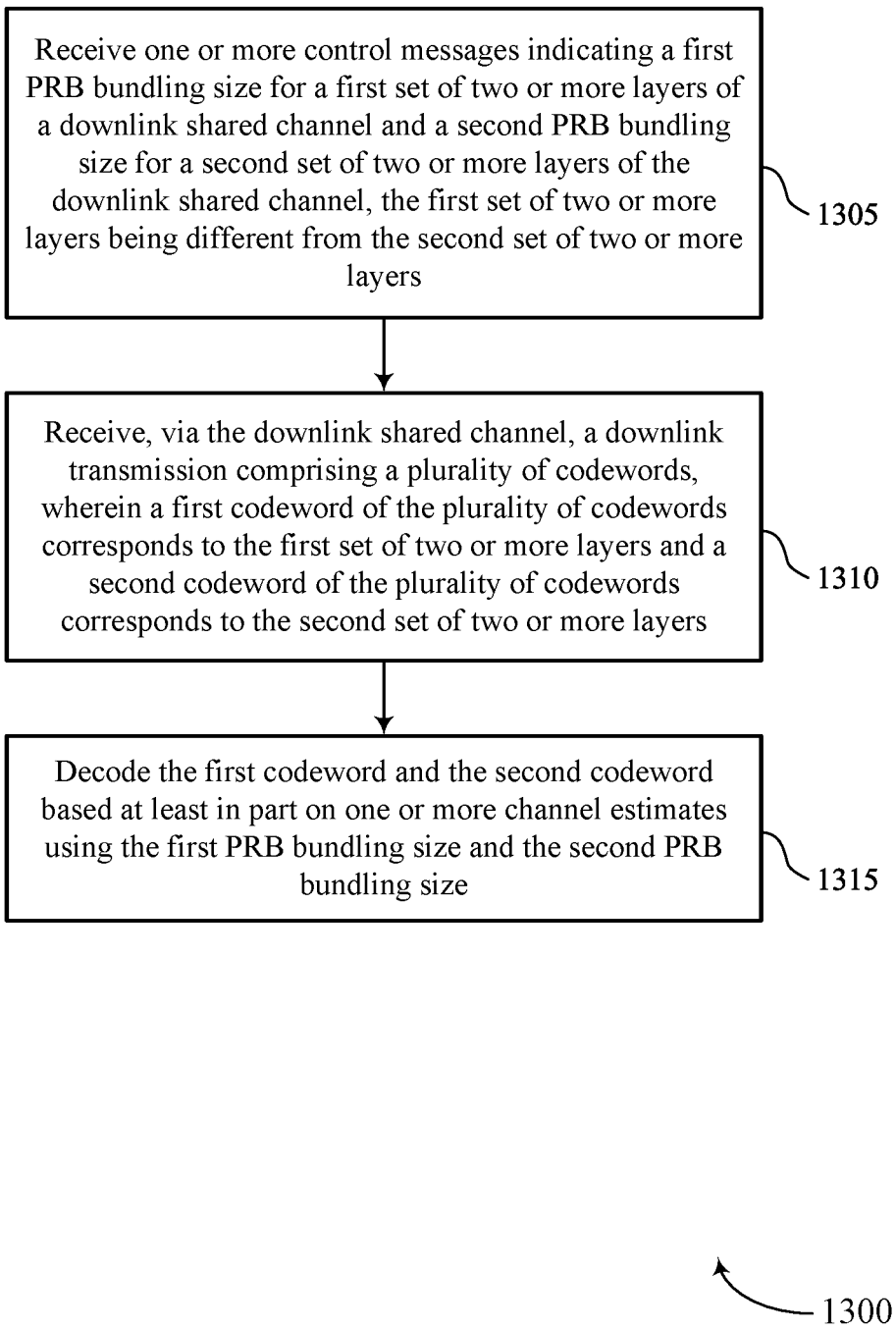
FIGS. 13 through 16 show flowcharts illustrating methods that support unequal PRG sizes for multiple-codeword downlink data transmissions in accordance with one or more aspects of the present disclosure.

FIG. 13 shows a flowchart illustrating a method 1300 that supports unequal PRG sizes for multiple-codeword downlink data transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving one or more control messages indicating a first PRB (PRB) bundling size for a first set of two or more layers of a downlink shared channel and a second PRB bundling size for a second set of two or more layers of the downlink shared channel, the first set of two or more layers being different from the second set of two or more layers. The operations of 1305 may be performed in accordance with examples as disclosed herein. In some examples, aspects of the operations of 1305 may be performed by a control message receiver 725 as described with reference to FIG. 7.

At 1310, the method may include receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The operations of 1310 may be performed in accordance with examples as disclosed herein. In some examples, aspects of the operations of 1310 may be performed by a downlink transmission receiver 730 as described with reference to FIG. 7.

At 1315, the method may include decoding the first codeword and the second codeword based on one or more channel estimates using the first PRB bundling size and the second PRB bundling size. The operations of 1315 may be performed in accordance with examples as disclosed herein. In some examples, aspects of the operations of 1315 may be performed by a decoding component 735 as described with reference to FIG. 7.

Figure 14:
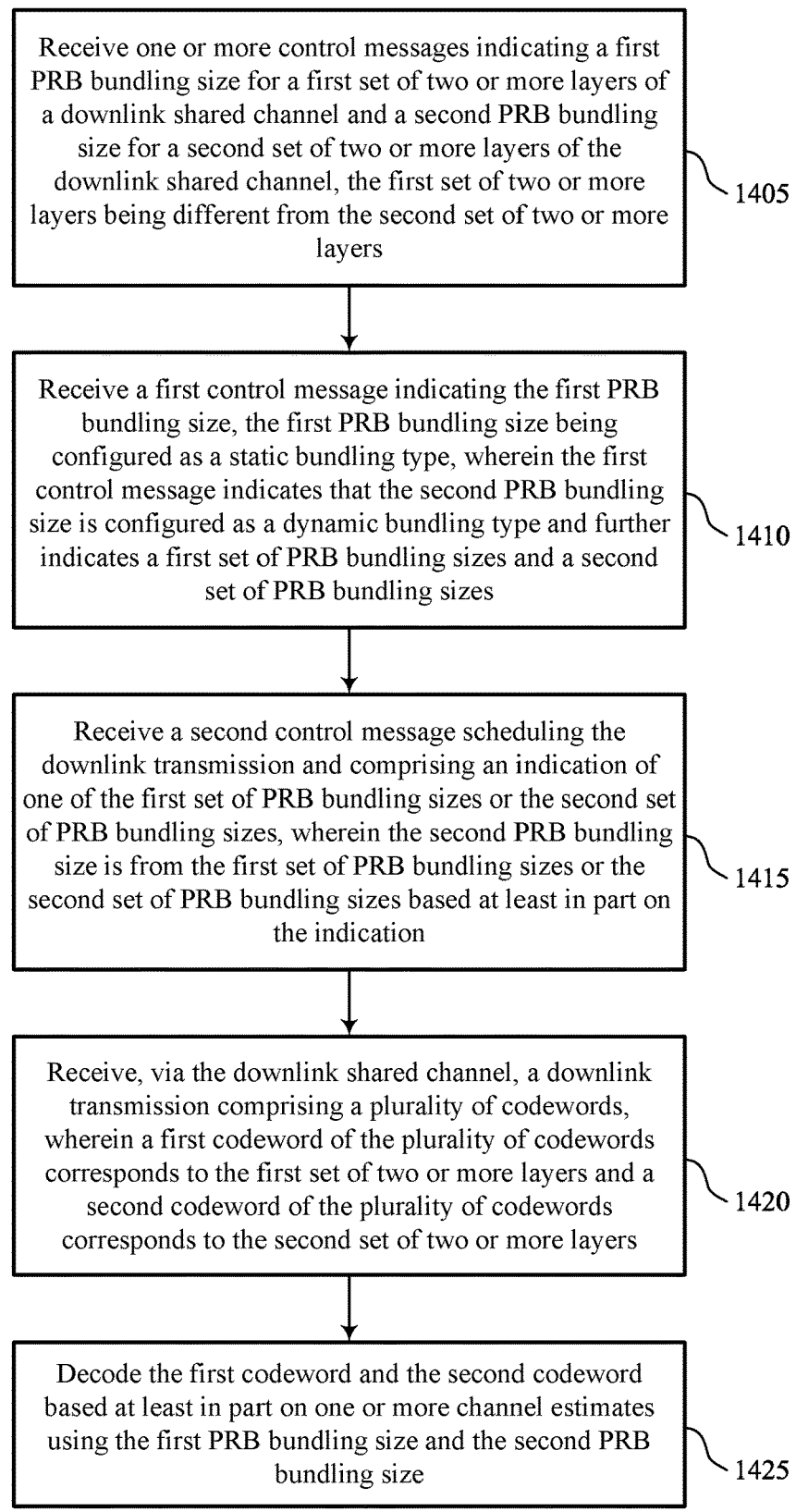

FIG. 14 shows a flowchart illustrating a method 1400 that supports unequal PRG sizes for multiple-codeword downlink data transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The operations of 1405 may be performed in accordance with examples as disclosed herein. In some examples, aspects of the operations of 1405 may be performed by a control message receiver 725 as described with reference to FIG. 7.

At 1410, the method may include receiving a first control message indicating the first PRB bundling size, the first PRB bundling size being configured as a static bundling type, where the first control message indicates that the second PRB bundling size is configured as a dynamic bundling type and further indicates a first set of PRB bundling sizes and a second set of PRB bundling sizes. The operations of 1410 may be performed in accordance with examples as disclosed herein. In some examples, aspects of the operations of 1410 may be performed by a control message receiver 725 as described with reference to FIG. 7.

At 1415, the method may include receiving a second control message scheduling the downlink transmission and including an indication of one of the first set of PRB bundling sizes or the second set of PRB bundling sizes, where the second PRB bundling size is from the first set of PRB bundling sizes or the second set of PRB bundling sizes based on the indication. The operations of 1415 may be performed in accordance with examples as disclosed herein. In some examples, aspects of the operations of 1415 may be performed by a control message receiver 725 as described with reference to FIG. 7.

At 1420, the method may include receiving, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The operations of 1420 may be performed in accordance with examples as disclosed herein. In some examples, aspects of the operations of 1420 may be performed by a downlink transmission receiver 730 as described with reference to FIG. 7.

At 1425, the method may include decoding the first codeword and the second codeword based on one or more channel estimates using the first PRB bundling size and the second PRB bundling size. The operations of 1425 may be performed in accordance with examples as disclosed herein. In some examples, aspects of the operations of 1425 may be performed by a decoding component 735 as described with reference to FIG. 7.

Figure 15:
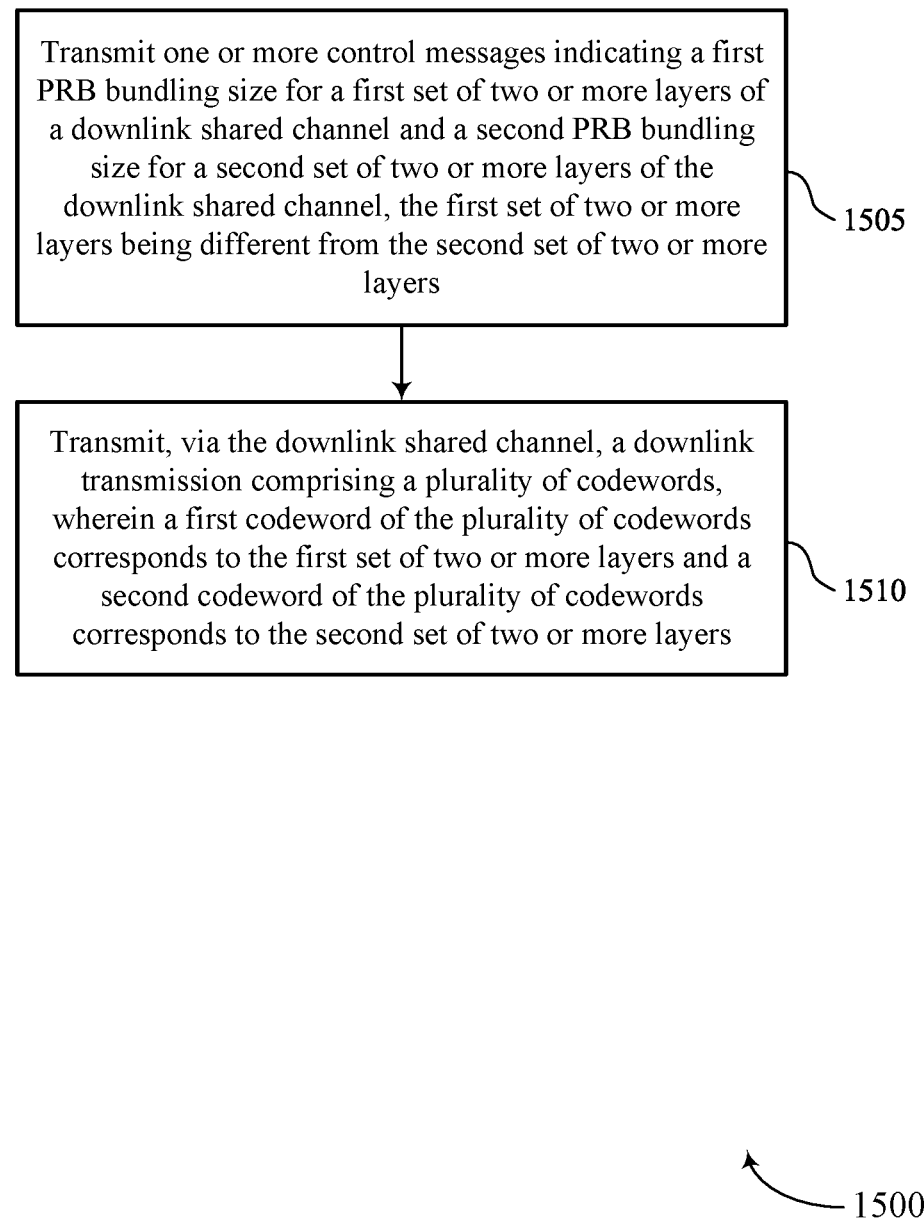

FIG. 15 shows a flowchart illustrating a method 1500 that supports unequal PRG sizes for multiple-codeword downlink data transmissions in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The operations of 1505 may be performed in accordance with examples as disclosed herein. In some examples, aspects of the operations of 1505 may be performed by a control message transmitter 1125 as described with reference to FIG. 11.

At 1510, the method may include transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The operations of 1510 may be performed in accordance with examples as disclosed herein. In some examples, aspects of the operations of 1510 may be performed by a downlink transmission component 1130 as described with reference to FIG. 11.

Figure 16:
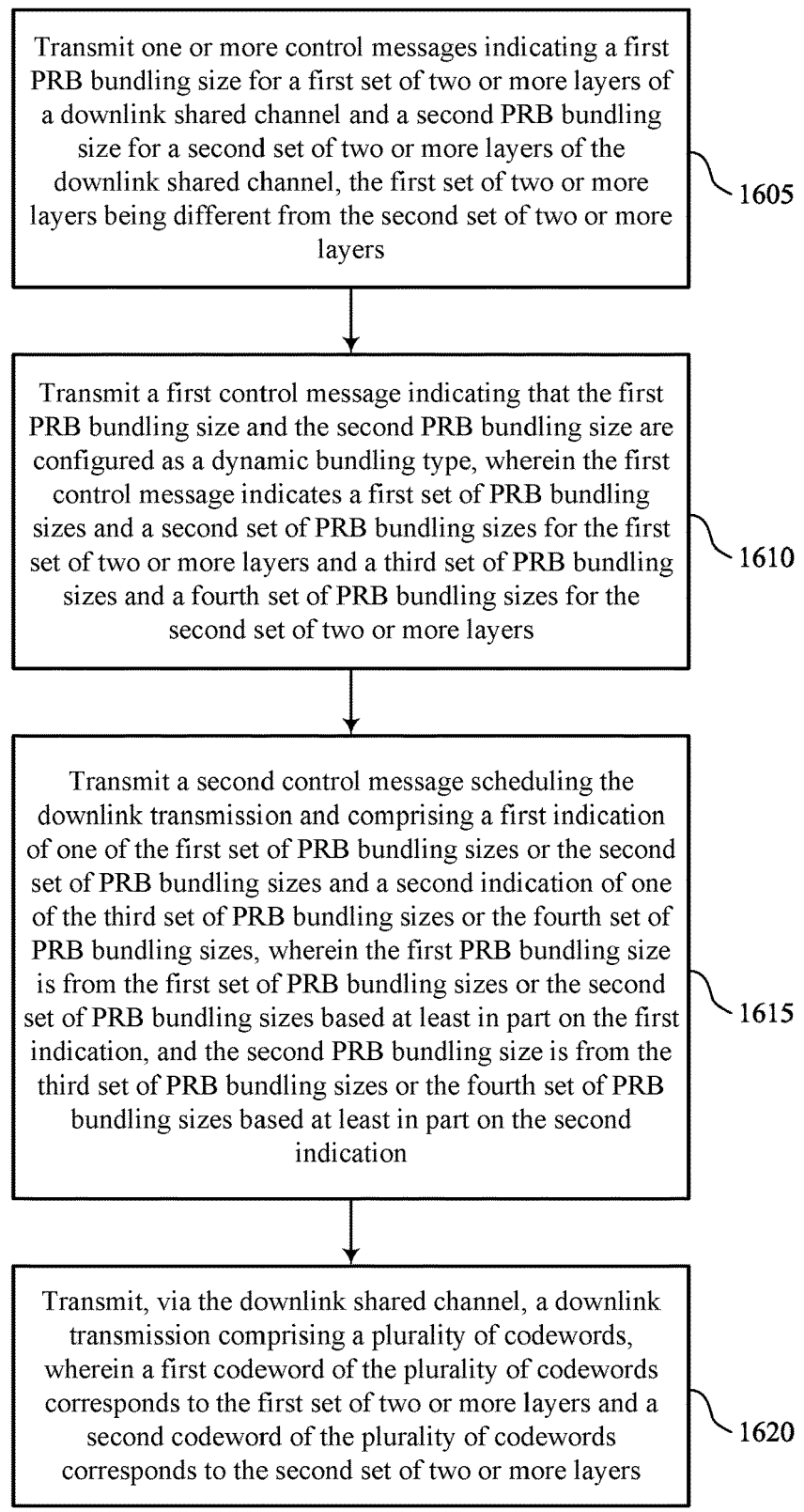

FIG. 16 shows a flowchart illustrating a method 1600 that supports unequal PRG sizes for multiple-codeword downlink data transmissions in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting one or more control messages indicating a first PRB bundling size for a first set of two or more layers of a downlink shared channel and a second PRB bundling size for a second set of two or more layers of the downlink shared channel, the first set of two or more layers being different from the second set of two or more layers. The operations of 1605 may be performed in accordance with examples as disclosed herein. In some examples, aspects of the operations of 1605 may be performed by a control message transmitter 1125 as described with reference to FIG. 11.

At 1610, the method may include transmitting a first control message indicating that the first PRB bundling size and the second PRB bundling size are configured as a dynamic bundling type, where the first control message indicates a first set of PRB bundling sizes and a second set of PRB bundling sizes for the first set of two or more layers and a third set of PRB bundling sizes and a fourth set of PRB bundling sizes for the second set of two or more layers. The operations of 1610 may be performed in accordance with examples as disclosed herein. In some examples, aspects of the operations of 1610 may be performed by a control message transmitter 1125 as described with reference to FIG. 11.

At 1615, the method may include transmitting a second control message scheduling the downlink transmission and including a first indication of one of the first set of PRB bundling sizes or the second set of PRB bundling sizes and a second indication of one of the third set of PRB bundling sizes or the fourth set of PRB bundling sizes, where the first PRB bundling size is from the first set of PRB bundling sizes or the second set of PRB bundling sizes based on the first indication, and the second PRB bundling size is from the third set of PRB bundling sizes or the fourth set of PRB bundling sizes based on the second indication. The operations of 1615 may be performed in accordance with examples as disclosed herein. In some examples, aspects of the operations of 1615 may be performed by a control message transmitter 1125 as described with reference to FIG. 11.

At 1620, the method may include transmitting, via the downlink shared channel, a downlink transmission including a set of multiple codewords, where a first codeword of the set of multiple codewords corresponds to the first set of two or more layers and a second codeword of the set of multiple codewords corresponds to the second set of two or more layers. The operations of 1620 may be performed in accordance with examples as disclosed herein. In some examples, aspects of the operations of 1620 may be performed by a downlink transmission component 1130 as described with reference to FIG. 11.

The following provides an overview of aspects of the present disclosure:

Aspect 1: A method for wireless communications, comprising: receiving one or more control messages indicating a first bundling size for a first set of two or more layers of a downlink shared channel and a second PRB bundling size for a second set of two or more layers of the downlink shared channel, the first set of two or more layers being different from the second set of two or more layers; receiving, via the downlink shared channel, a downlink transmission comprising a plurality of codewords, wherein a first codeword of the plurality of codewords corresponds to the first set of two or more layers and a second codeword of the plurality of codewords corresponds to the second set of two or more layers; and decoding the first codeword and the second codeword based at least in part on one or more channel estimates using the first PRB bundling size and the second PRB bundling size.

Aspect 2: The method of aspect 1, wherein receiving the one or more control messages comprises: receiving a first control message indicating the first PRB bundling size and the second PRB bundling size, wherein the first PRB bundling size and the second PRB bundling size are configured as a static bundling type.

Aspect 3: The method of aspect 2, wherein the first control message includes a common indication that the first PRB bundling size and the second PRB bundling size are both configured as the static bundling type.

Aspect 4: The method of aspect 1, wherein receiving the one or more control messages comprises: receiving a first control message indicating the first PRB bundling size, the first PRB bundling size being configured as a static bundling type, wherein the first control message indicates that the second PRB bundling size is configured as a dynamic bundling type and further indicates a first set of PRB bundling sizes and a second set of PRB bundling sizes; and receiving a second control message scheduling the downlink transmission and comprising an indication of one of the first set of PRB bundling sizes or the second set of PRB bundling sizes, wherein the second PRB bundling size is from the first set of PRB bundling sizes or the second set of PRB bundling sizes based at least in part on the indication.

Aspect 5: The method of aspect 4, wherein the second PRB bundling size is from the first set of PRB bundling sizes and the first set of PRB bundling sizes includes multiple PRB bundling sizes, the method further comprising: determining the second PRB bundling size based at least in part on a size of PRBs allocated to the second codeword, a ratio of a size of the PRBs allocated to the second codeword and size of a bandwidth part associated with the second codeword, an MCS associated with the second set of two or more layers, a quantity of layers of the second set of two or more layers, or a combination thereof.

Aspect 6: The method of aspect 5, wherein the first set of two or more layers is associated with a private data stream of the downlink transmission and the second set of two or more layers is associated with a common data stream of the downlink transmission, the private data stream being associated with downlink data for a first wireless device and the common data stream being associated with downlink data for the first wireless device and with downlink data for a second wireless device different from the first wireless device.

Aspect 7: The method of any of aspects 4 through 6, wherein the first PRB bundling size is from a set of two or more PRB bundling sizes, the set of two or more PRB bundling sizes including an indication that the first PRB bundling size is a same PRB bundling size as the second PRB bundling size, the method further comprising: determining the second PRB bundling size based at least in part on the second control message and the first set of PRB bundling sizes or the second set of PRB bundling sizes; and determining that the first PRB bundling size is the same PRB bundling size as the second PRB bundling size based at least in part on the second PRB bundling size being configured as the dynamic bundling type and the first control message indicating that the first PRB bundling size is the same as the second PRB bundling size.

Aspect 8: The method of aspect 7, wherein the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

Aspect 9: The method of aspect 1, wherein receiving the one or more control messages comprises: receiving a first control message indicating that the first PRB bundling size and the second PRB bundling size are configured as a dynamic bundling type, wherein the first control message indicates a first set of PRB bundling sizes and a second set of PRB bundling sizes for the first set of two or more layers and a third set of PRB bundling sizes and a fourth set of PRB bundling sizes for the second set of two or more layers; and receiving a second control message scheduling the downlink transmission and comprising a first indication of one of the first set of PRB bundling sizes or the second set of PRB bundling sizes and a second indication of one of the third set of PRB bundling sizes or the fourth set of PRB bundling sizes, wherein the first PRB bundling size is from the first set of PRB bundling sizes or the second set of PRB bundling sizes based at least in part on the first indication, and the second PRB bundling size is from the third set of PRB bundling sizes or the fourth set of PRB bundling sizes based at least in part on the second indication.

Aspect 10: The method of aspect 9, further comprising: determining the first PRB bundling size based at least in part on the second control message indicating the first set of PRB bundling sizes and a ratio of a size of the PRBs allocated to the first codeword and size of a bandwidth part associated with the first codeword.

Aspect 11: The method of aspect 9, further comprising: determining the first PRB bundling size based at least in part on the second control message indicating the second set of PRB bundling sizes, wherein the first PRB bundling size comprises a PRB bundling size from the second set of PRB bundling sizes.

Aspect 12: The method of any of aspects 9 through 11, wherein the first set of PRB bundling sizes is different from the third set of PRB bundling sizes; and the second set of PRB bundling sizes is different from the fourth set of PRB bundling sizes.

Aspect 13: The method of any of aspects 9 through 11, wherein the first set of PRB bundling sizes is the same as the third set of PRB bundling sizes; and the second set of PRB bundling sizes is the same as the fourth set of PRB bundling sizes.

Aspect 14: The method of any of aspects 9 through 13, wherein the first control message includes a common indication that the first PRB bundling size and the second PRB bundling size are both configured as the dynamic bundling type.

Aspect 15: The method of aspect 1, wherein receiving the one or more control messages comprises: receiving a first control message indicating that the first PRB bundling size and the second PRB bundling size are configured as a dynamic bundling type; and receiving a second control message scheduling the downlink transmission and comprising a value that indicates two or more pairs of PRB bundling sizes corresponding to the first PRB bundling size and the second PRB bundling size.

Aspect 16: The method of aspect 15, wherein a mapping between the value and the two or more pairs of PRB bundling sizes are configured via RRC signaling or are preconfigured.

Aspect 17: The method of any of aspects 15 through 16, wherein the value indicates that the second PRB bundling size is a smaller PRB bundling size than the first PRB bundling size; and the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

Aspect 18: The method of aspect 1, wherein receiving the one or more control messages comprises: receiving a first control message indicating that the first PRB bundling size and the second PRB bundling size are configured as a dynamic bundling type and further indicates a first set of PRB bundling sizes and a second set of PRB bundling sizes; and receiving a second control message scheduling the downlink transmission and comprising a first indication of the first set of PRB bundling sizes or the second set of PRB bundling sizes, wherein the first PRB bundling size is from the first set of PRB bundling sizes or the second set of PRB bundling sizes based at least in part on the indication, the second control message further comprising a second indication of whether the second PRB bundling size is a same PRB bundling size as the first PRB bundling size.

Aspect 19: The method of aspect 18, wherein the second indication comprises an indication that the second PRB bundling size is the same PRB bundling size as the first PRB bundling size; and the second PRB bundling size is determined based at least in part on the first PRB bundling size and the second indication.

Aspect 20: The method of aspect 18, wherein the second indication comprises an indication that the second PRB bundling size is different from the first PRB bundling size; and the second PRB bundling size is determined based at least in part on the first PRB bundling size and the second indication.

Aspect 21: The method of aspect 20, wherein the first PRB bundling size is at least one PRB bundling size increment greater than the second PRB bundling size based at least in part on the second indication, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

Aspect 22: The method of any of aspects 18 through 19, wherein the second PRB bundling size comprises a wideband PRB bundling size; and the first PRB bundling size comprises the wideband PRB bundling size based at least in part on the second PRB bundling size comprising the wideband PRB bundling size, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

Aspect 23: The method of any of aspects 1 through 22, further comprising: determining the second PRB bundling size based at least in part on the one or more control messages, wherein the first PRB bundling size comprises a wideband PRB bundling size based at least in part on two or more PRBs associated with the downlink transmission being contiguous in a frequency domain, and wherein the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

Aspect 24: The method of any of aspects 1 through 22, further comprising: determining the second PRB bundling size based at least in part on the one or more control messages; and determining the first PRB bundling size based at least in part on two or more PRBs associated with the downlink transmission being non-contiguous in a frequency domain, wherein the first set of two or more layers corresponds to a common data stream of the downlink transmission and the second set of two or more layers corresponds to a private data stream of the downlink transmission, the private data stream being associated with downlink data for a first wireless device and the common data stream being associated with downlink data for the first wireless device and with downlink data for a second wireless device different from the first wireless device.

Aspect 25: The method of aspect 24, wherein the first PRB bundling size and the PRB bundling size are a same PRB bundling size based at least in part on the two or more PRBs being non-contiguous.

Aspect 26: The method of aspect 24, wherein the first PRB bundling size comprises a predetermined value.

Aspect 27: The method of aspect 24, wherein the two or more PRBs of the downlink transmission include at least one portion that is contiguous in the frequency domain; and the first PRB bundling size is equal to a size of the contiguous portion of the two or more PRBs.

Aspect 28: A method for wireless communications at a network entity, comprising: transmitting one or more control messages indicating a first PRB bundling size for a first set of two or more layers of a downlink shared channel and a second PRB bundling size for a second set of two or more layers of the downlink shared channel, the first set of two or more layers being different from the second set of two or more layers; and transmitting, via the downlink shared channel, a downlink transmission comprising a plurality of codewords, wherein a first codeword of the plurality of codewords corresponds to the first set of two or more layers and a second codeword of the plurality of codewords corresponds to the second set of two or more layers.

Aspect 29: The method of aspect 28, wherein transmitting the one or more control messages comprises: transmitting a first control message indicating the first PRB bundling size and the second PRB bundling size, wherein the first PRB bundling size and the second PRB bundling size are configured as a static bundling type.

Aspect 30: The method of aspect 29, wherein the first control message includes a common indication that the first PRB bundling size and the second PRB bundling size are both configured as the static bundling type.

Aspect 31: The method of aspect 28, wherein transmitting the one or more control messages comprises: transmitting a first control message indicating the first PRB bundling size, the first PRB bundling size being configured as a static bundling type, wherein the first control message indicates that the second PRB bundling size is configured as a dynamic bundling type and further indicates a first set of PRB bundling sizes and a second set of PRB bundling sizes; and transmitting a second control message scheduling the downlink transmission and comprising an indication of one of the first set of PRB bundling sizes or the second set of PRB bundling sizes, wherein the second PRB bundling size is from the first set of PRB bundling sizes or the second set of PRB bundling sizes based at least in part on the indication.

Aspect 32: The method of aspect 31, wherein the second PRB bundling size is selected from the first set of PRB bundling sizes and the first set of PRB bundling sizes includes multiple PRB bundling sizes, the method further comprising: selecting the second PRB bundling size based at least in part on a size of PRBs allocated to the second codeword, a ratio of a size of the PRBs allocated to the second codeword and size of a bandwidth part associated with the second codeword, an MCS associated with the second set of two or more layers, a quantity of layers of the second set of two or more layers, or a combination thereof.

Aspect 33: The method of aspect 32, wherein the first set of two or more layers is associated with a private data stream of the downlink transmission and the second set of two or more layers is associated with a common data stream of the downlink transmission, the private data stream being associated with downlink data for a first wireless device and the common data stream being associated with downlink data for the first wireless device and with downlink data for a second wireless device different from the first wireless device.

Aspect 34: The method of aspect 31, wherein the first PRB bundling size is selected from a set of two or more PRB bundling sizes, the set of two or more PRB bundling sizes including an indication that the first PRB bundling size is a same PRB bundling size as the second PRB bundling size, the method further comprising: selecting the second PRB bundling size based at least in part on the second control message and the first set of PRB bundling sizes or the second set of PRB bundling sizes; and selecting that the first PRB bundling size is the same PRB bundling size as the second PRB bundling size based at least in part on the second PRB bundling size being configured as the dynamic bundling type and the first control message indicating that the first PRB bundling size is the same as the second PRB bundling size.

Aspect 35: The method of aspect 34, wherein the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

Aspect 36: The method of aspect 28, wherein transmitting the one or more control messages comprises: transmitting a first control message indicating that the first PRB bundling size and the second PRB bundling size are configured as a dynamic bundling type, wherein the first control message indicates a first set of PRB bundling sizes and a second set of PRB bundling sizes for the first set of two or more layers and a third set of PRB bundling sizes and a fourth set of PRB bundling sizes for the second set of two or more layers; and transmitting a second control message scheduling the downlink transmission and comprising a first indication of one of the first set of PRB bundling sizes or the second set of PRB bundling sizes and a second indication of one of the third set of PRB bundling sizes or the fourth set of PRB bundling sizes, wherein the first PRB bundling size is from the first set of PRB bundling sizes or the second set of PRB bundling sizes based at least in part on the first indication, and the second PRB bundling size is from the third set of PRB bundling sizes or the fourth set of PRB bundling sizes based at least in part on the second indication.

Aspect 37: The method of aspect 36, further comprising: selecting the first PRB bundling size based at least in part on the second control message indicating the first set of PRB bundling sizes and a ratio of a size of the PRBs allocated to the first codeword and size of a bandwidth part associated with the first codeword.

Aspect 38: The method of aspect 36, further comprising: selecting the first PRB bundling size based at least in part on the second control message indicating the second set of PRB bundling sizes, wherein the first PRB bundling size comprises a PRB bundling size from the second set of PRB bundling sizes.

Aspect 39: The method of any of aspects 36 through 38, wherein the first set of PRB bundling sizes is different from the third set of PRB bundling sizes; and the second set of PRB bundling sizes is different from the fourth set of PRB bundling sizes.

Aspect 40: The method of any of aspects 36 through 38, wherein the first set of PRB bundling sizes is the same as the third set of PRB bundling sizes; and the second set of PRB bundling sizes is the same as the fourth set of PRB bundling sizes.

Aspect 41: The method of any of aspects 36 through 40, wherein the first control message includes a common indication that the first PRB bundling size and the second PRB bundling size are both configured as the dynamic bundling type.

Aspect 42: The method of aspect 28, wherein transmitting the one or more control messages comprises: transmitting a first control message indicating that the first PRB bundling size and the second PRB bundling size are configured as a dynamic bundling type; and transmitting a second control message scheduling the downlink transmission and comprising a value that indicates two or more pairs of PRB bundling sizes corresponding to the first PRB bundling size and the second PRB bundling size.

Aspect 43: The method of aspect 42, wherein a mapping between the value and the two or more pairs of PRB bundling sizes are configured via RRC signaling or are preconfigured.

Aspect 44: The method of any of aspects 42 through 43, wherein the value indicates that the second PRB bundling size is a smaller PRB bundling size than the first PRB bundling size; and the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

Aspect 45: The method of aspect 28, wherein transmitting the one or more control messages comprises: transmitting a first control message indicating that the first PRB bundling size and the second PRB bundling size are configured as a dynamic bundling type and further indicates a first set of PRB bundling sizes and a second set of PRB bundling sizes; and transmitting a second control message scheduling the downlink transmission and comprising a first indication of the first set of PRB bundling sizes or the second set of PRB bundling sizes, wherein the first PRB bundling size is from the first set of PRB bundling sizes or the second set of PRB bundling sizes based at least in part on the indication, the second control message further comprising a second indication of whether the second PRB bundling size is a same PRB bundling size as the first PRB bundling size.

Aspect 46: The method of aspect 45, wherein the second indication comprises an indication that the second PRB bundling size is the same PRB bundling size as the first PRB bundling size; and the second PRB bundling size is selected based at least in part on the first PRB bundling size and the second indication.

Aspect 47: The method of aspect 45, wherein the second indication comprises an indication that the second PRB bundling size is different from the first PRB bundling size; and the second PRB bundling size is selected based at least in part on the first PRB bundling size and the second indication.

Aspect 48: The method of aspect 47, wherein the first PRB bundling size is at least one PRB bundling size increment greater than the second PRB bundling size based at least in part on the second indication, the first set of two or more layers being associated with a common data stream of the downlink transmission, and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

Aspect 49: The method of any of aspects 45 through 46, wherein the second PRB bundling size comprises a wideband PRB bundling size; and the first PRB bundling size comprises the wideband PRB bundling size based at least in part on the second PRB bundling size comprising the wideband PRB bundling size, the first set of two or more layers being associated with a common data stream of the downlink transmission, and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

Aspect 50: The method of any of aspects 28 through 49, further comprising: selecting the second PRB bundling size based at least in part on the one or more control messages, wherein the first PRB bundling size comprises a wideband PRB bundling size based at least in part on two or more PRBs associated with the downlink transmission being contiguous in a frequency domain, and wherein the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

Aspect 51: The method of any of aspects 28 through 49, further comprising: selecting the second PRB bundling size based at least in part on the one or more control messages; and selecting the first PRB bundling size based at least in part on two or more PRBs associated with the downlink transmission being non-contiguous in a frequency domain, wherein the first set of two or more layers corresponds to a common data stream of the downlink transmission and the second set of two or more layers corresponds to a private data stream of the downlink transmission, the private data stream being associated with downlink data for a first wireless device and the common data stream being associated with downlink data for the first wireless device and with downlink data for a second wireless device different from the first wireless device.

Aspect 52: The method of aspect 51, wherein the first PRB bundling size and the PRB bundling size are a same PRB bundling size based at least in part on the two or more PRBs being non-contiguous.

Aspect 53: The method of aspect 51, wherein the first PRB bundling size comprises a predetermined value.

Aspect 54: The method of aspect 51, wherein the two or more PRBs of the downlink transmission include at least one portion that is contiguous in the frequency domain; and the first PRB bundling size is equal to a size of the contiguous portion of the two or more PRBs.

Aspect 55: An apparatus for wireless communications, comprising a processor; memory coupled with the processor; and instructions stored in the memory and executable by the processor to cause the apparatus to perform a method of any of aspects 1 through 27.

Aspect 58: An apparatus for wireless communications, comprising at least one means for performing a method of any of aspects 1 through 27.

Aspect 59: A non-transitory computer-readable medium storing code for wireless communications, the code comprising instructions executable by a processor to perform a method of any of aspects 1 through 27.

Aspect 60: An apparatus for wireless communications at a network entity, comprising a processor; memory coupled with the processor; and instructions stored in the memory and executable by the processor to cause the apparatus to perform a method of any of aspects 28 through 55.

Aspect 61: An apparatus for wireless communications at a network entity, comprising at least one means for performing a method of any of aspects 28 through 55.

Aspect 62: A non-transitory computer-readable medium storing code for wireless communications at a network entity, the code comprising instructions executable by a processor to perform a method of any of aspects 28 through 55.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, comprising:
   receiving one or more control messages indicating a first physical resource block (PRB) bundling size for a first set of two or more layers of a downlink shared channel and a second PRB bundling size for a second set of two or more layers of the downlink shared channel, the first set of two or more layers being different from the second set of two or more layers, the one or more control messages indicating whether each of the first PRB bundling size and the second PRB bundling size is configured as a static bundling type or a dynamic bundling type;
   receiving, via the downlink shared channel, a downlink transmission comprising a plurality of codewords, wherein a first codeword of the plurality of codewords corresponds to the first set of two or more layers and a second codeword of the plurality of codewords corresponds to the second set of two or more layers; and
   decoding the first codeword and the second codeword based at least in part on one or more channel estimates using the first PRB bundling size and the second PRB bundling size.

2. The method of claim 1, wherein a first control message of the one or more control messages includes a common indication that the first PRB bundling size and the second PRB bundling size are both configured as the static bundling type.

3. A method for wireless communications, comprising:
   receiving one or more control messages indicating a first physical resource block (PRB) bundling size for a first set of two or more layers of a downlink shared channel and a second PRB bundling size for a second set of two or more layers of the downlink shared channel, the first set of two or more layers being different from the second set of two or more layers, the first PRB bundling size being configured as a static bundling type, wherein the one or more control messages include:
      a first control message indicating that the second PRB bundling size is configured as a dynamic bundling type and further indicating a first set of PRB bundling sizes and a second set of PRB bundling sizes; and
      a second control message scheduling a downlink transmission and comprising an indication of one of the first set of PRB bundling sizes or the second set of PRB bundling sizes, wherein the second PRB bundling size is from the first set of PRB bundling sizes or the second set of PRB bundling sizes based at least in part on the indication:
   receiving, via the downlink shared channel, the downlink transmission, the downlink transmission comprising a plurality of codewords, wherein a first codeword of the plurality of codewords corresponds to the first set of two or more layers and a second codeword of the plurality of codewords corresponds to the second set of two or more layers; and
   decoding the first codeword and the second codeword based at least in part on one or more channel estimates using the first PRB bundling size and the second PRB bundling size.

4. The method of claim 3, wherein the second PRB bundling size is from the first set of PRB bundling sizes and the first set of PRB bundling sizes includes multiple PRB bundling sizes, the method further comprising:
   determining the second PRB bundling size based at least in part on a size of PRBs allocated to the second codeword, a ratio of a size of the PRBs allocated to the second codeword and size of a bandwidth part associated with the second codeword, a modulation and coding scheme associated with the second set of two or more layers, a quantity of layers of the second set of two or more layers, or a combination thereof.

5. The method of claim 4, wherein the first set of two or more layers is associated with a private data stream of the downlink transmission and the second set of two or more layers is associated with a common data stream of the downlink transmission, the private data stream being associated with downlink data for a first wireless device and the common data stream being associated with downlink data for the first wireless device and with downlink data for a second wireless device different from the first wireless device.

6. The method of claim 3, wherein the first PRB bundling size is from a set of two or more PRB bundling sizes, the set of two or more PRB bundling sizes including an indication that the first PRB bundling size is a same PRB bundling size as the second PRB bundling size, the method further comprising:
   determining the second PRB bundling size based at least in part on the second control message and the first set of PRB bundling sizes or the second set of PRB bundling sizes; and
   determining that the first PRB bundling size is the same PRB bundling size as the second PRB bundling size based at least in part on the second PRB bundling size being configured as the dynamic bundling type and the first control message indicating that the first PRB bundling size is the same as the second PRB bundling size.

7. The method of claim 6, wherein the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

8. A method for wireless communications, comprising:
   receiving one or more control messages indicating a first physical resource block (PRB) bundling size for a first set of two or more layers of a downlink shared channel and a second PRB bundling size for a second set of two or more layers of the downlink shared channel, the first set of two or more layers being different from the second set of two or more layers, the one or more control messages including:
     a first control message indicating that the first PRB bundling size and the second PRB bundling size are configured as a dynamic bundling type, wherein the first control message indicates a first set of PRB bundling sizes and a second set of PRB bundling sizes for the first set of two or more layers and a third set of PRB bundling sizes and a fourth set of PRB bundling sizes for the second set of two or more layers; and
     a second control message scheduling a downlink transmission and comprising a first indication of one of the first set of PRB bundling sizes or the second set of PRB bundling sizes and a second indication of one of the third set of PRB bundling sizes or the fourth set of PRB bundling sizes, wherein the first PRB bundling size is from the first set of PRB bundling sizes or the second set of PRB bundling sizes based at least in part on the first indication, and the second PRB bundling size is from the third set of PRB bundling sizes or the fourth set of PRB bundling sizes based at least in part on the second indication;

receiving, via the downlink shared channel, the downlink transmission, the downlink transmission comprising a plurality of codewords, wherein a first codeword of the plurality of codewords corresponds to the first set of two or more layers and a second codeword of the plurality of codewords corresponds to the second set of two or more layers; and
decoding the first codeword and the second codeword based at least in part on one or more channel estimates using the first PRB bundling size and the second PRB bundling size.

9. The method of claim 8, further comprising:
   determining the first PRB bundling size based at least in part on the second control message indicating the first set of PRB bundling sizes and a ratio of a size of the PRBs allocated to the first codeword and size of a bandwidth part associated with the first codeword.

10. The method of claim 8, further comprising:
    determining the first PRB bundling size based at least in part on the second control message indicating the second set of PRB bundling sizes, wherein the first PRB bundling size comprises a PRB bundling size from the second set of PRB bundling sizes.

11. The method of claim 8, wherein:
    the first set of PRB bundling sizes is different from the third set of PRB bundling sizes; and
    the second set of PRB bundling sizes is different from the fourth set of PRB bundling sizes.

12. The method of claim 8, wherein:
    the first set of PRB bundling sizes is the same as the third set of PRB bundling sizes; and
    the second set of PRB bundling sizes is the same as the fourth set of PRB bundling sizes.

13. The method of claim 8, wherein the first control message includes a common indication that the first PRB bundling size and the second PRB bundling size are both configured as the dynamic bundling type.

14. The method of claim 1, wherein the one or more control messages include a second control message scheduling the downlink transmission and comprising a value that indicates two or more pairs of PRB bundling sizes corresponding to the first PRB bundling size and the second PRB bundling size.

15. The method of claim 14, wherein a mapping between the value and the two or more pairs of PRB bundling sizes are configured via radio resource control signaling or are preconfigured.

16. The method of claim 14, wherein:
    the value indicates that the second PRB bundling size is a smaller PRB bundling size than the first PRB bundling size; and
    the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

17. The method of claim 1, wherein the one or more control messages include:
    a first control message indicating that the first PRB bundling size and the second PRB bundling size are configured as the dynamic bundling type and further indicating a first set of PRB bundling sizes and a second set of PRB bundling sizes; and a second control message scheduling the downlink transmission and comprising a first indication of the first set of PRB bundling sizes or the second set of PRB bundling sizes, wherein the first PRB bundling size is from the first set of PRB bundling sizes or the second set of PRB bundling sizes based at least in part on the indication, the second control message further comprising a second indication of whether the second PRB bundling size is a same PRB bundling size as the first PRB bundling size.

18. The method of claim 17, wherein:
the second indication comprises an indication that the second PRB bundling size is the same PRB bundling size as the first PRB bundling size; and
the second PRB bundling size is determined based at least in part on the first PRB bundling size and the second indication.

19. The method of claim 17, wherein:
the second indication comprises an indication that the second PRB bundling size is different from the first PRB bundling size; and
the second PRB bundling size is determined based at least in part on the first PRB bundling size and the second indication.

20. The method of claim 19, wherein the first PRB bundling size is at least one PRB bundling size increment greater than the second PRB bundling size based at least in part on the second indication, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

21. The method of claim 17, wherein:
the second PRB bundling size comprises a wideband PRB bundling size; and
the first PRB bundling size comprises the wideband PRB bundling size based at least in part on the second PRB bundling size comprising the wideband PRB bundling size, the first set of two or more layers being associated with a common data stream of the downlink transmission and the second set of two or more layers being associated with a private data stream of the downlink transmission, the private data stream being associated with downlink data for a first wireless device and the common data stream being associated with downlink data for the first wireless device and with downlink data for a second wireless device different from the first wireless device.

22. The method of claim 1, further comprising:
determining the second PRB bundling size based at least in part on the one or more control messages, wherein the first PRB bundling size comprises a wideband PRB bundling size based at least in part on two or more PRBs associated with the downlink transmission being contiguous in a frequency domain, and wherein the first set of two or more layers is associated with a common data stream of the downlink transmission and the second set of two or more layers is associated with a private data stream of the downlink transmission, the private data stream being associated with downlink data for a first wireless device and the common data stream being associated with downlink data for the first wireless device and with downlink data for a second wireless device different from the first wireless device.

23. The method of claim 1, further comprising:
determining the second PRB bundling size based at least in part on the one or more control messages; and
determining the first PRB bundling size based at least in part on two or more PRBs associated with the downlink transmission being non-contiguous in a frequency domain, wherein the first set of two or more layers corresponds to a common data stream of the downlink transmission and the second set of two or more layers corresponds to a private data stream of the downlink transmission, the private data stream being associated with downlink data for a first wireless device and the common data stream being associated with downlink data for the first wireless device and with downlink data for a second wireless device different from the first wireless device.

24. The method of claim 23, wherein the first PRB bundling size and the PRB bundling size are a same PRB bundling size based at least in part on the two or more PRBs being non-contiguous.

25. The method of claim 23, wherein the first PRB bundling size comprises a predetermined value.

26. The method of claim 23, wherein:
the two or more PRBs of the downlink transmission include at least one portion that is contiguous in the frequency domain; and
the first PRB bundling size is equal to a size of the contiguous portion of the two or more PRBs.

27. A method for wireless communications at a network entity, comprising:
transmitting one or more control messages indicating a first physical resource block (PRB) bundling size for a first set of two or more layers of a downlink shared channel and a second PRB bundling size for a second set of two or more layers of the downlink shared channel, the first set of two or more layers being different from the second set of two or more layers, the one or more control messages indicating whether each of the first PRB bundling size and the second PRB bundling size is configured as a static bundling type or a dynamic bundling type; and
transmitting, via the downlink shared channel, a downlink transmission comprising a plurality of codewords, wherein a first codeword of the plurality of codewords corresponds to the first set of two or more layers and a second codeword of the plurality of codewords corresponds to the second set of two or more layers.

28. An apparatus for wireless communications, comprising:
a processor;
memory coupled with the processor; and
instructions stored in the memory and executable by the processor to cause the apparatus to:
receive one or more control messages indicating a first physical resource block (PRB) bundling size for a first set of two or more layers of a downlink shared channel and a second PRB bundling size for a second set of two or more layers of the downlink shared channel, the first set of two or more layers being different from the second set of two or more layers, the one or more control messages indicating whether each of the first PRB bundling size and the second PRB bundling size is configured as a static bundling type or a dynamic bundling type;

receive, via the downlink shared channel, a downlink transmission comprising a plurality of codewords, wherein a first codeword of the plurality of codewords corresponds to the first set of two or more layers and a second codeword of the plurality of codewords corresponds to the second set of two or more layers; and decode the first codeword and the second codeword based at least in part on one or more channel estimates using the first PRB bundling size and the second PRB bundling size.

29. An apparatus for wireless communications at a network entity, comprising:

a processor;

memory coupled with the processor; and instructions stored in the memory and executable by the processor to cause the apparatus to:

transmit one or more control messages indicating a first physical resource block (PRB) bundling size for a first set of two or more layers of a downlink shared channel and a second PRB bundling size for a second set of two or more layers of the downlink shared channel, the first set of two or more layers being different from the second set of two or more layers, the one or more control messages indicating whether each of the first PRB bundling size and the second PRB bundling size is configured as a static bundling type or a dynamic bundling type; and transmit, via the downlink shared channel, a downlink transmission comprising a plurality of codewords, wherein a first codeword of the plurality of codewords corresponds to the first set of two or more layers and a second codeword of the plurality of codewords corresponds to the second set of two or more layers.

* * * * *